(12) United States Patent
Ewerling et al.

(10) Patent No.: US 12,026,328 B2
(45) Date of Patent: Jul. 2, 2024

(54) ARRANGEMENT FOR RECOGNITION BY A TOUCH-SENSITIVE SENSOR MATRIX

(71) Applicant: Interactive Scape GmbH, Berlin (DE)

(72) Inventors: Philipp Ewerling, Berlin (DE); Giles Coope, Berlin (DE); Günter Paul Peters, Berlin (DE); Ulrich Mangold, Berlin (DE); Hauke Helmer, Berlin (DE)

(73) Assignee: Interactive Scape GmbH, Berlin (DE)

( * ) Notice: Subject to any disclaimer, the term of this patent is extended or adjusted under 35 U.S.C. 154(b) by 0 days.

(21) Appl. No.: 17/754,343

(22) PCT Filed: Sep. 29, 2020

(86) PCT No.: PCT/EP2020/077195
§ 371 (c)(1),
(2) Date: Mar. 30, 2022

(87) PCT Pub. No.: WO2021/063927
PCT Pub. Date: Apr. 8, 2021

(65) Prior Publication Data
US 2022/0334656 A1 Oct. 20, 2022

(30) Foreign Application Priority Data
Oct. 1, 2019 (EP) .................... 19200825

(51) Int. Cl.
*G06F 3/0362* (2013.01)
*G06F 3/039* (2013.01)
(52) U.S. Cl.
CPC .......... *G06F 3/0362* (2013.01); *G06F 3/0393* (2019.05)

(58) Field of Classification Search
CPC ....... G06F 3/044; G06F 3/0362; G06F 3/0393
See application file for complete search history.

(56) References Cited

U.S. PATENT DOCUMENTS 9,335,873 B2   5/2016 Cowd et al.
2009/0273573 A1* 11/2009 Hotelling ............. G06F 3/0362
                                              345/173

(Continued)

FOREIGN PATENT DOCUMENTS

EP    2724761 A1   4/2014
EP    3494461 A1   6/2019

(Continued)

OTHER PUBLICATIONS

"International Application Serial No. PCT/EP2020/077195, International Search Report dated Dec. 22, 2020", w/ English Translation, (dated Dec. 22, 2020), 5 pgs.

(Continued)

*Primary Examiner* — Hang Lin
(74) *Attorney, Agent, or Firm* — Schwegman Lundberg & Woessner, P.A.

(57) ABSTRACT

Disclosed is an arrangement for detection by a touch-sensitive sensor matrix, comprising an electrically conductive structure, the structure having an annular touch surface and a marker, and an electrically insulating substrate material on which the structure is applied or in which the structure is embedded. Also disclosed is a method for detecting the arrangement on a touch-sensitive sensor matrix, a method for manufacturing the arrangement, a method for manufacturing a group of arrangements, and a system comprising the arrangement.

21 Claims, 16 Drawing Sheets

(56) References Cited

U.S. PATENT DOCUMENTS

Figure 2:
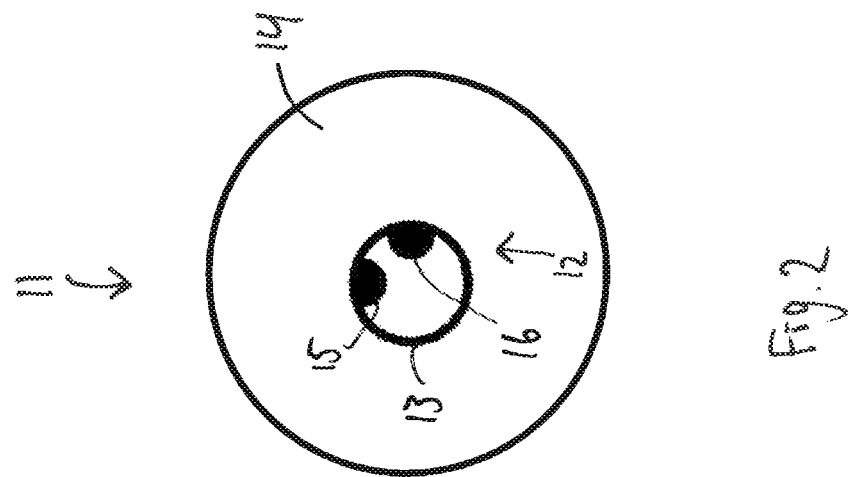

| | | |
|---|---|---|
| 2010/0149119 A1 | 6/2010 | Homma et al. |
| 2018/0104941 A1* | 4/2018 | Free ........................ B32B 3/263 |
| 2018/0150145 A1* | 5/2018 | Valentine .............. G06F 3/0321 |

FOREIGN PATENT DOCUMENTS

| | | |
|---|---|---|
| EP | 3557397 A1 | 10/2019 |
| WO | WO-2011154524 A1 | 12/2011 |
| WO | WO-2018134418 A1 | 7/2018 |

OTHER PUBLICATIONS

"International Application Serial No. PCT/EP2020/077195, Written Opinion dated Dec. 22, 2020", (dated Dec. 22, 2020), 9 pgs.

* cited by examiner

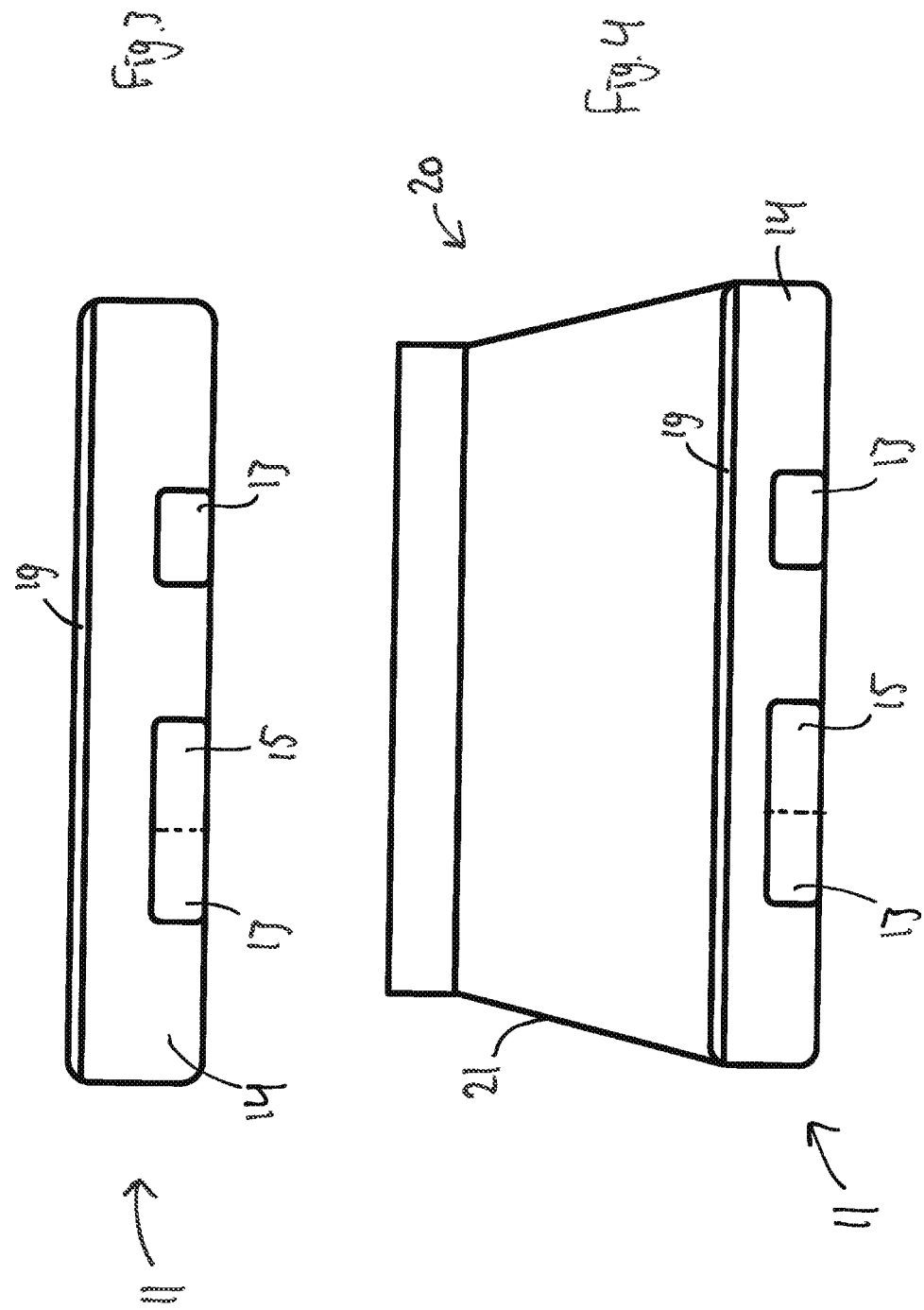

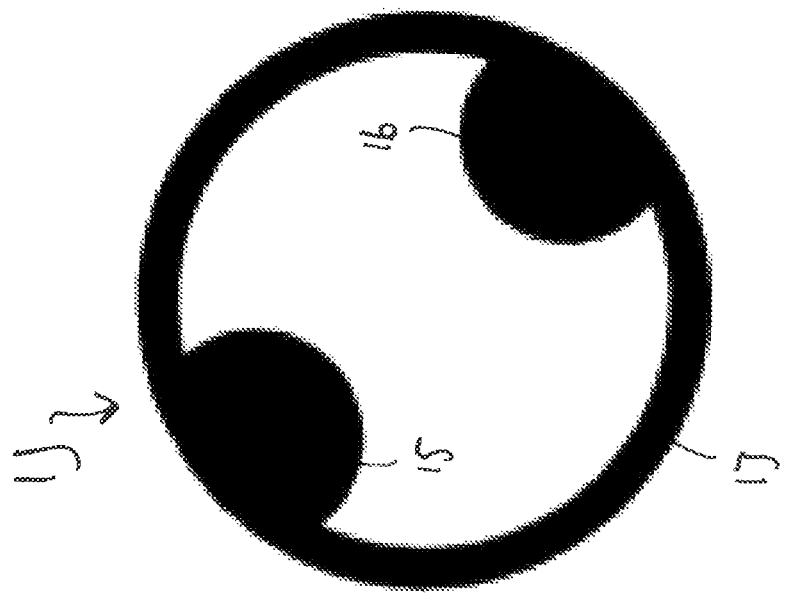
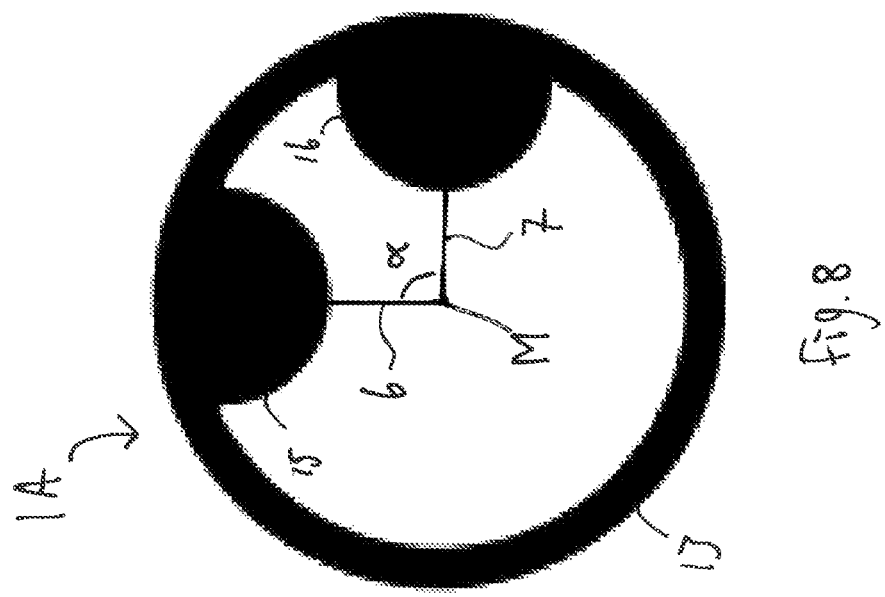
Fig. 8

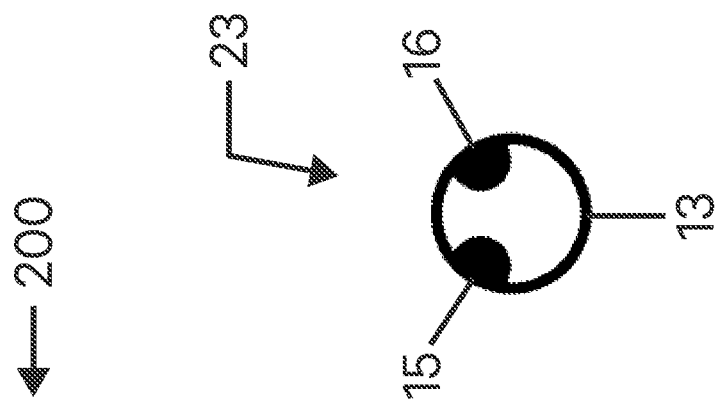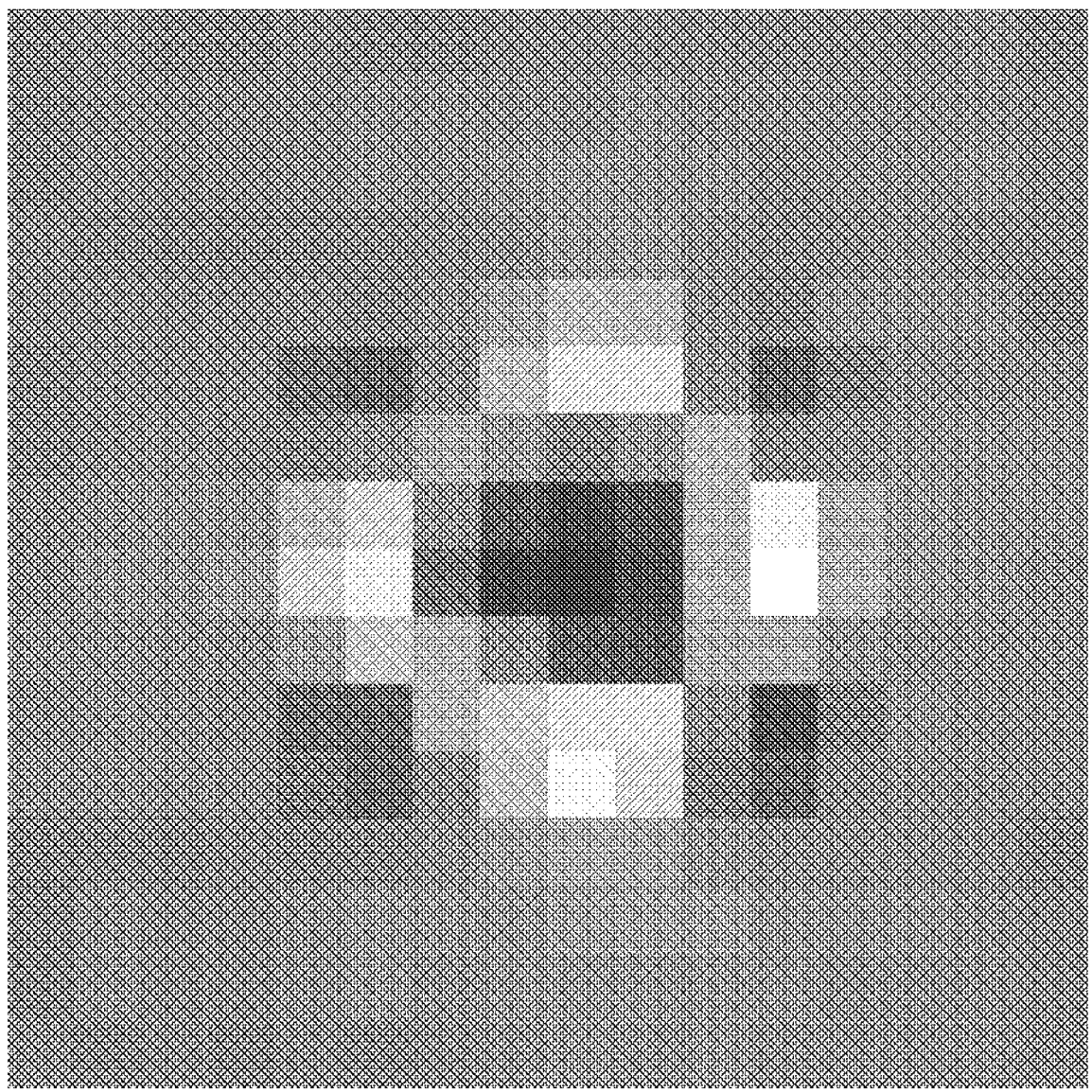
Fig. 10

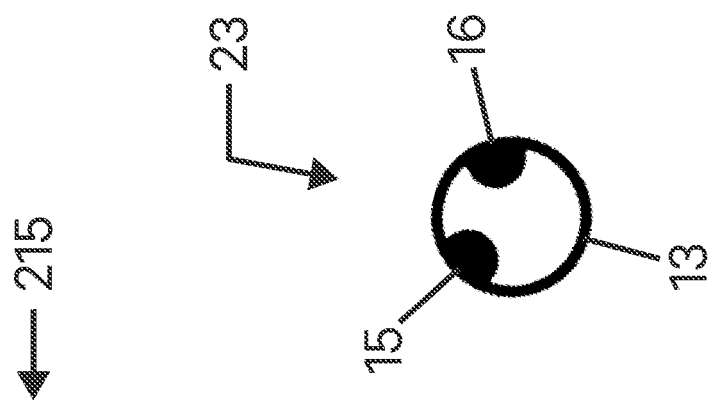
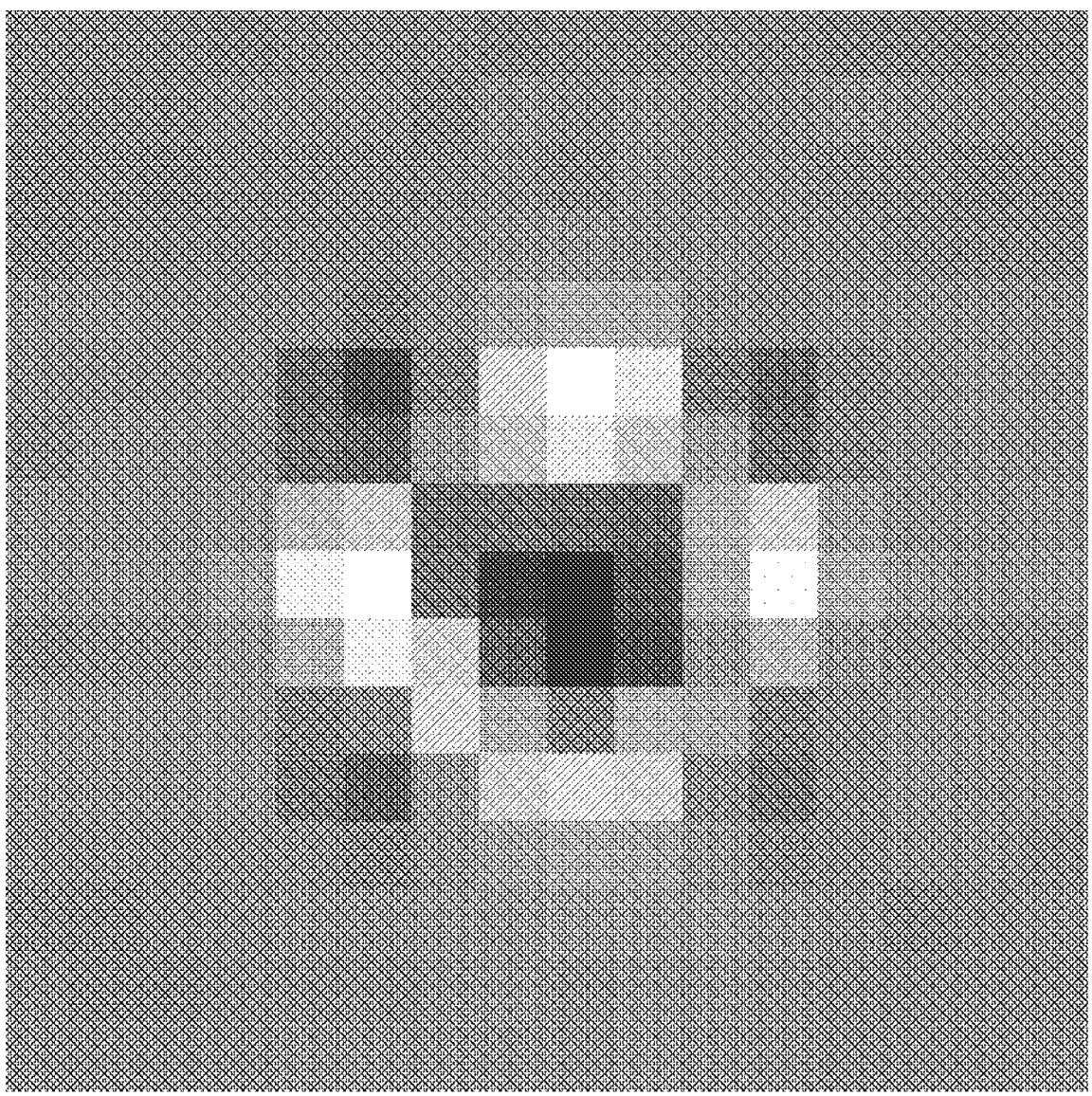
Fig. 11

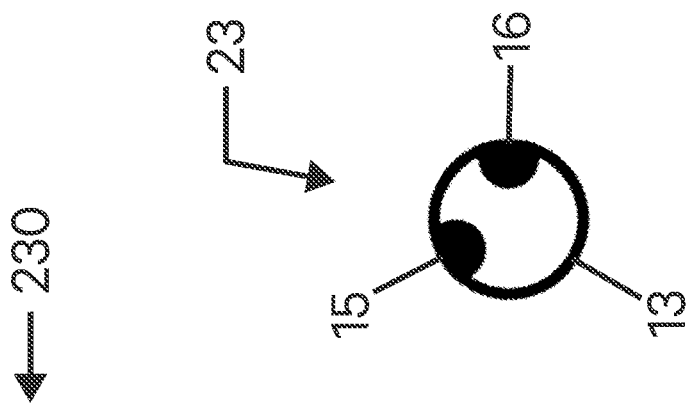
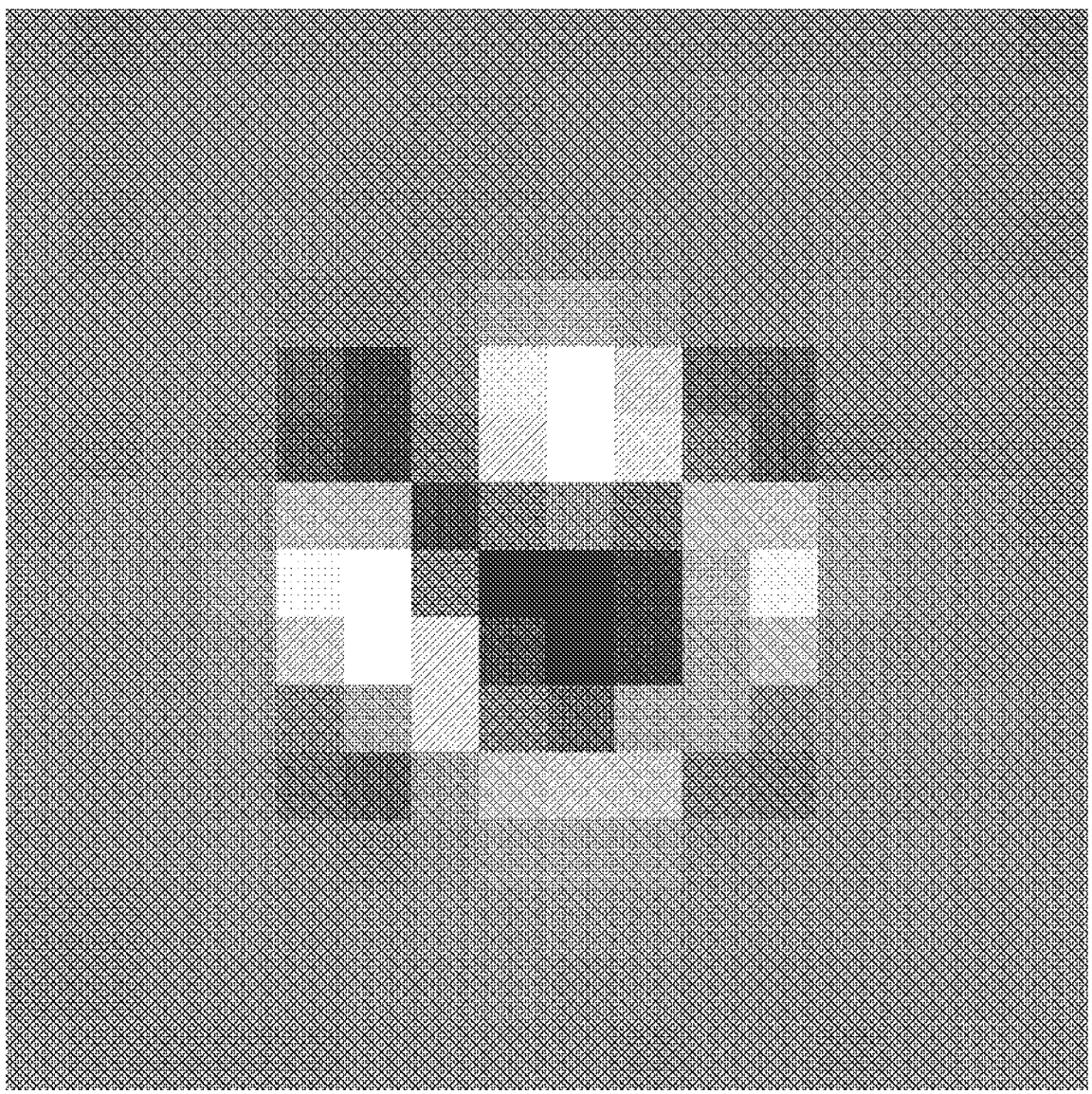
Fig. 12

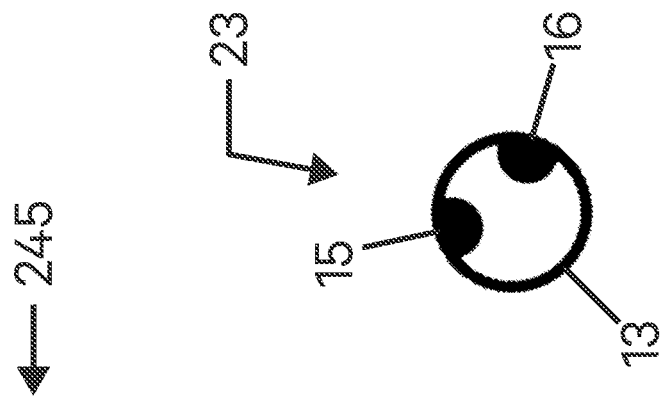
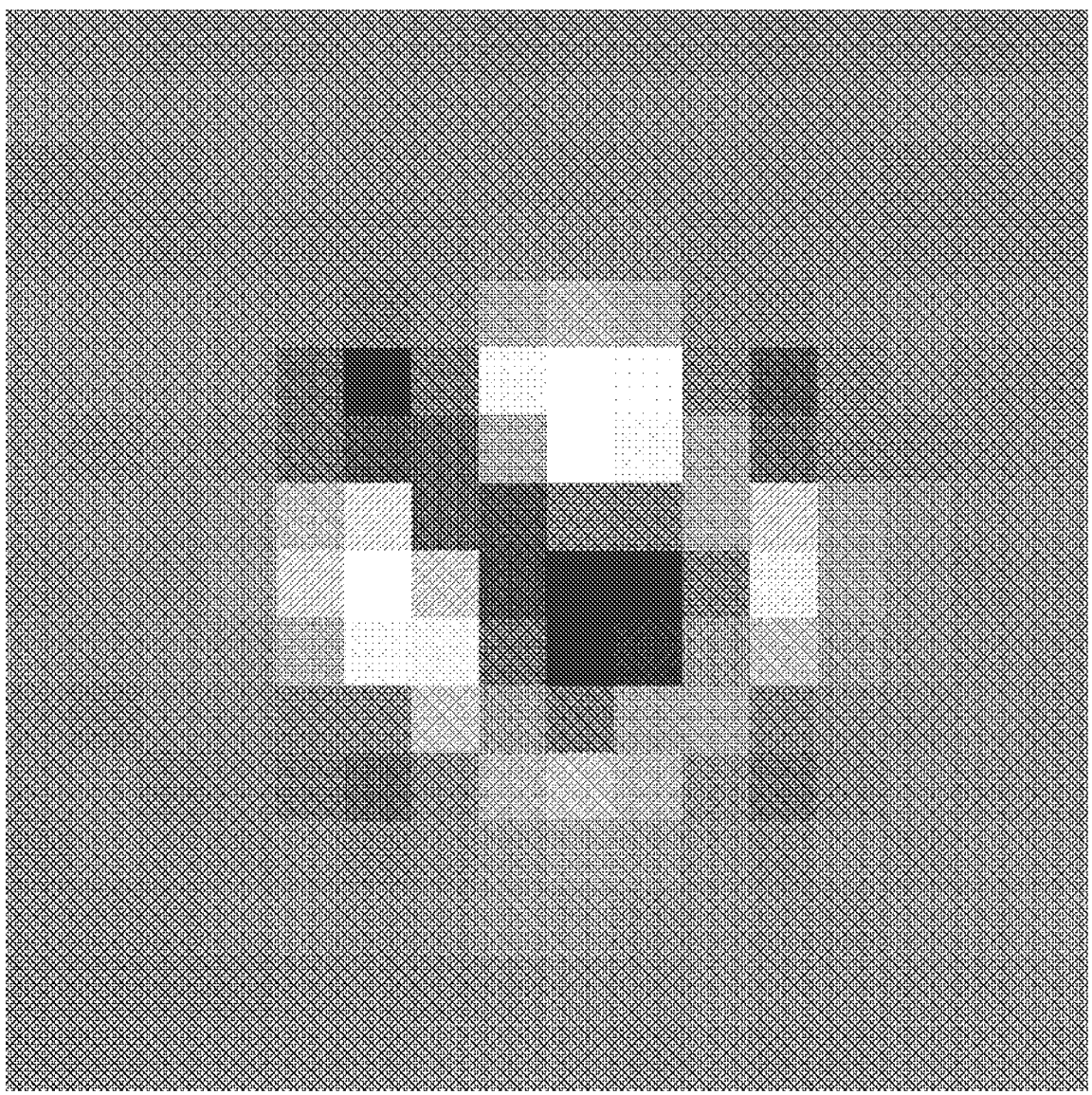
Fig. 13

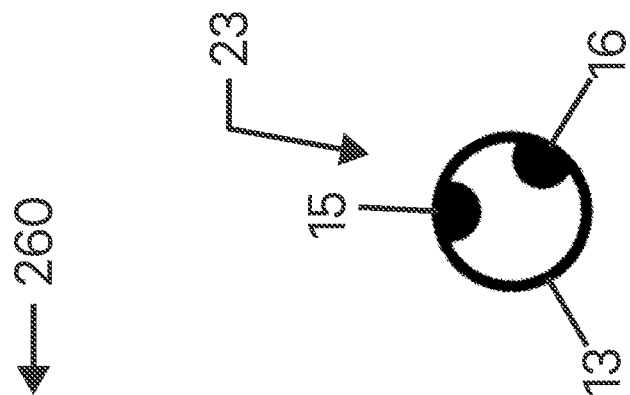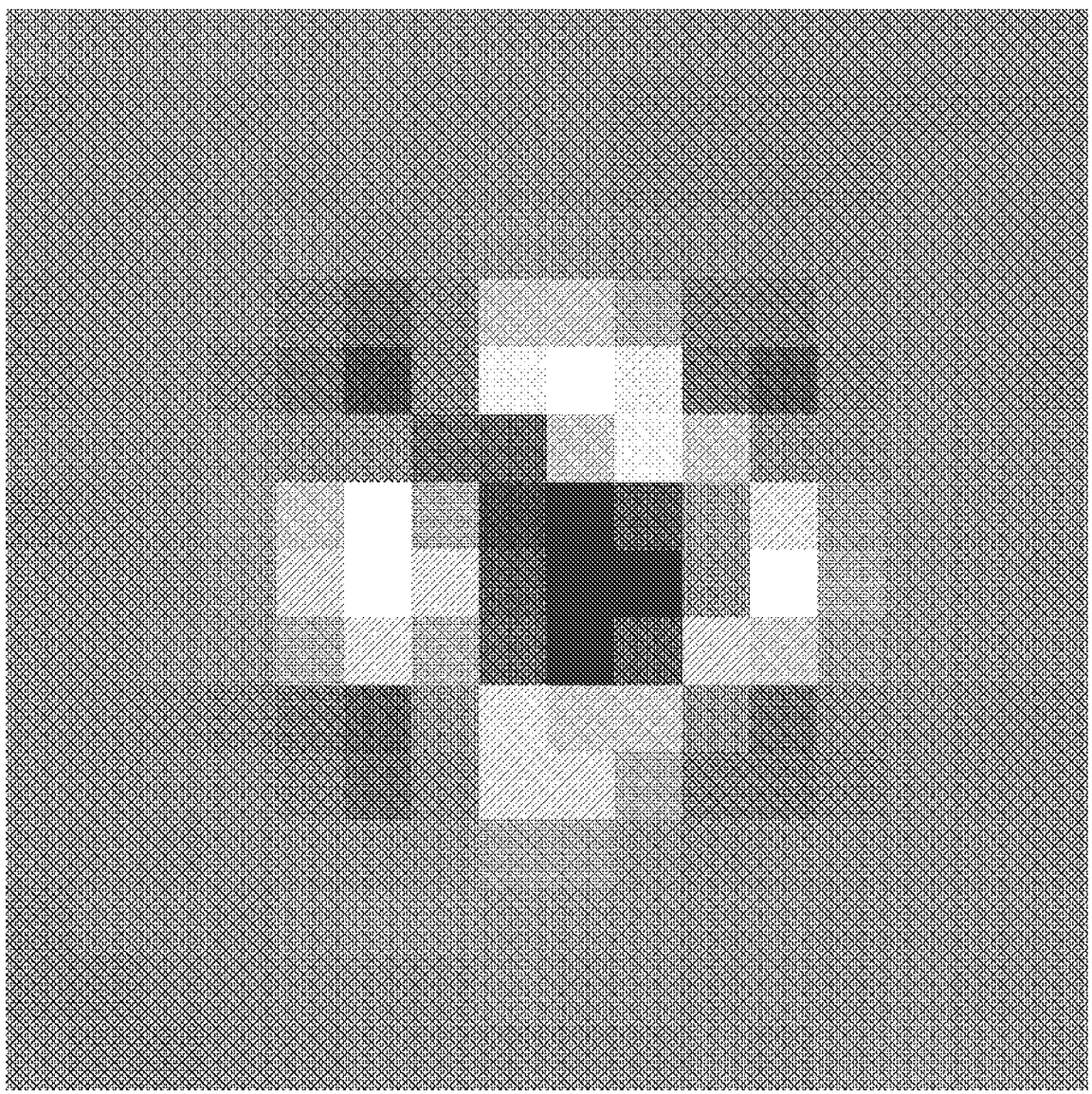
Fig. 14

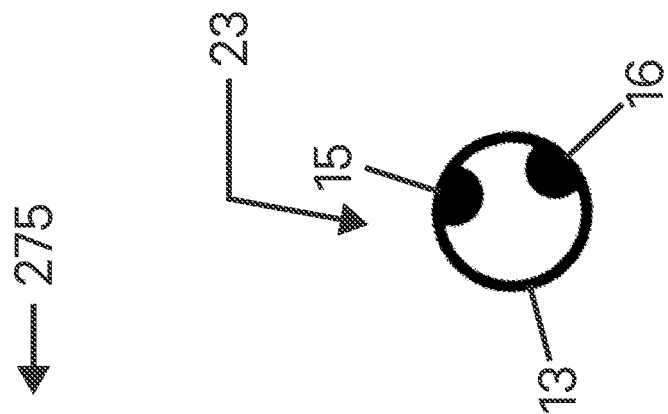
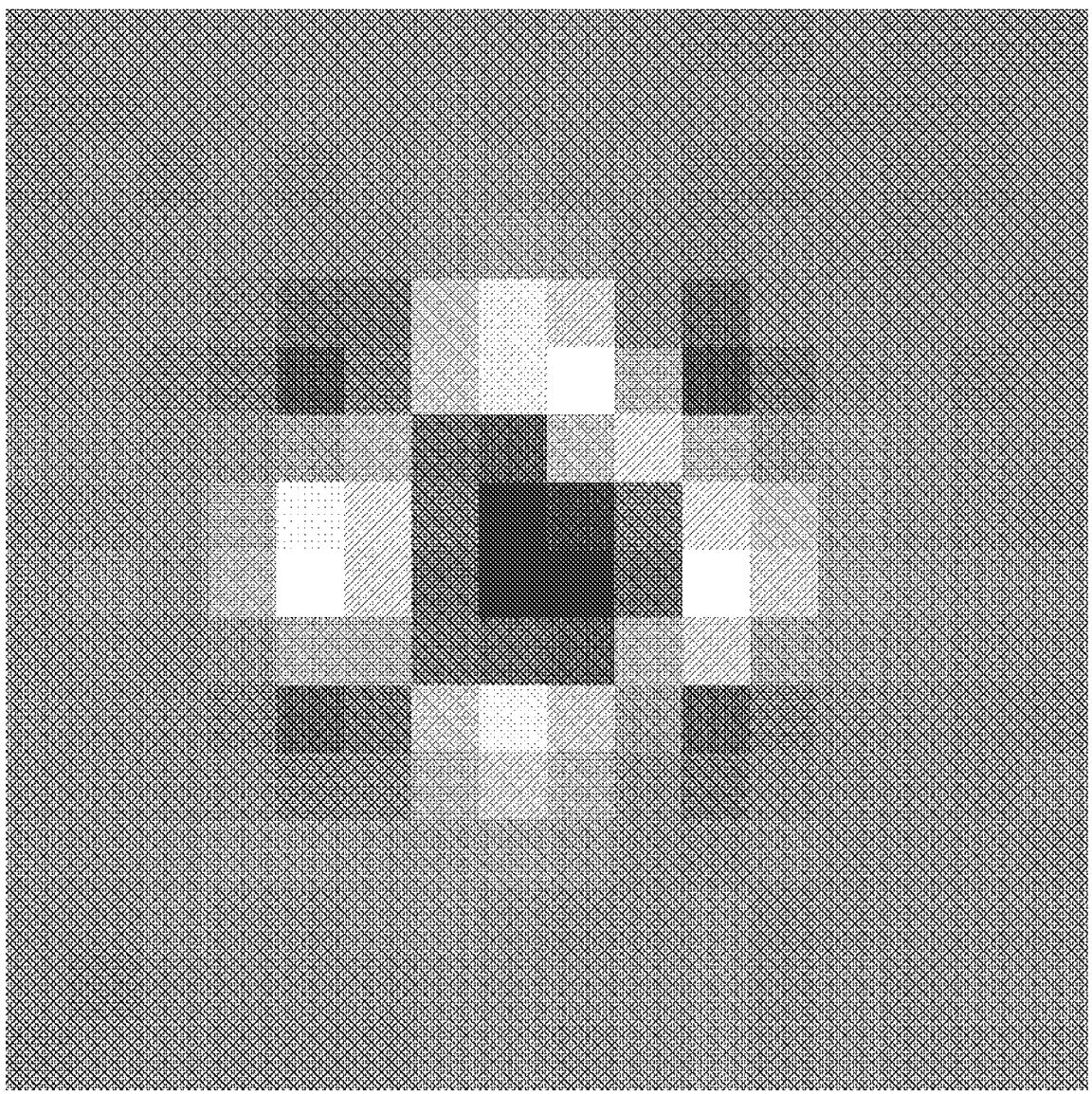
Fig. 15

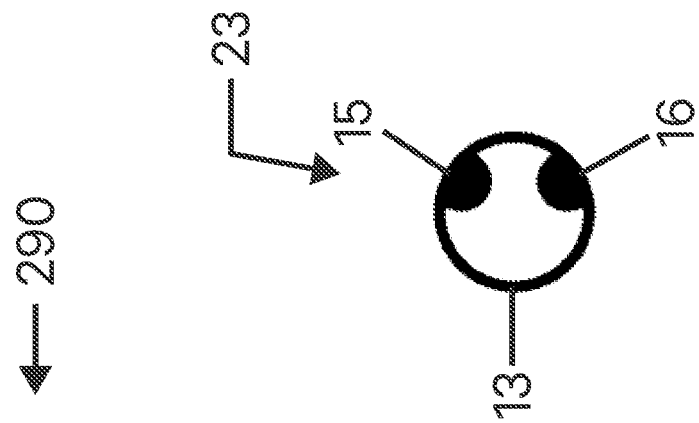
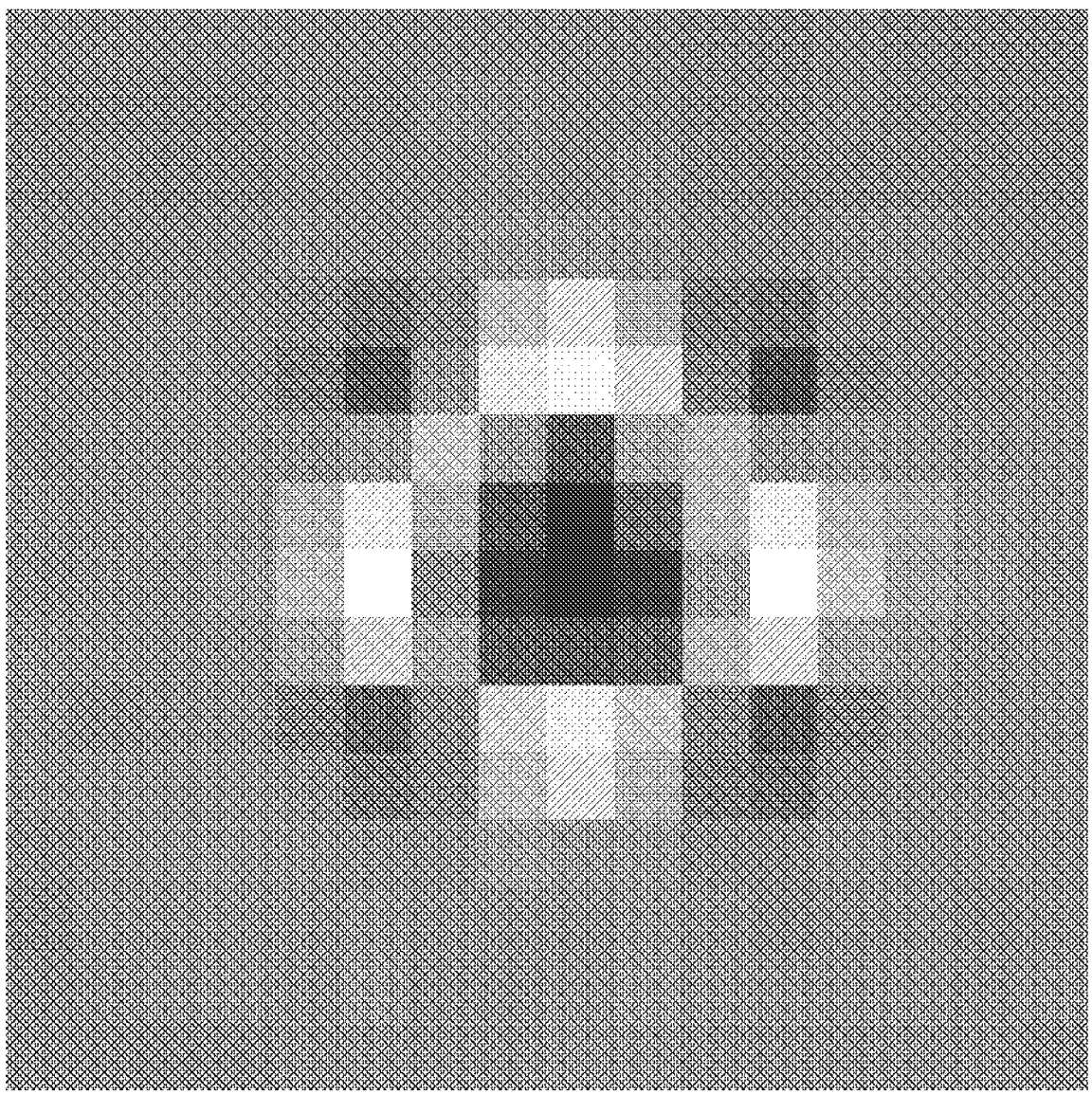
Fig. 16

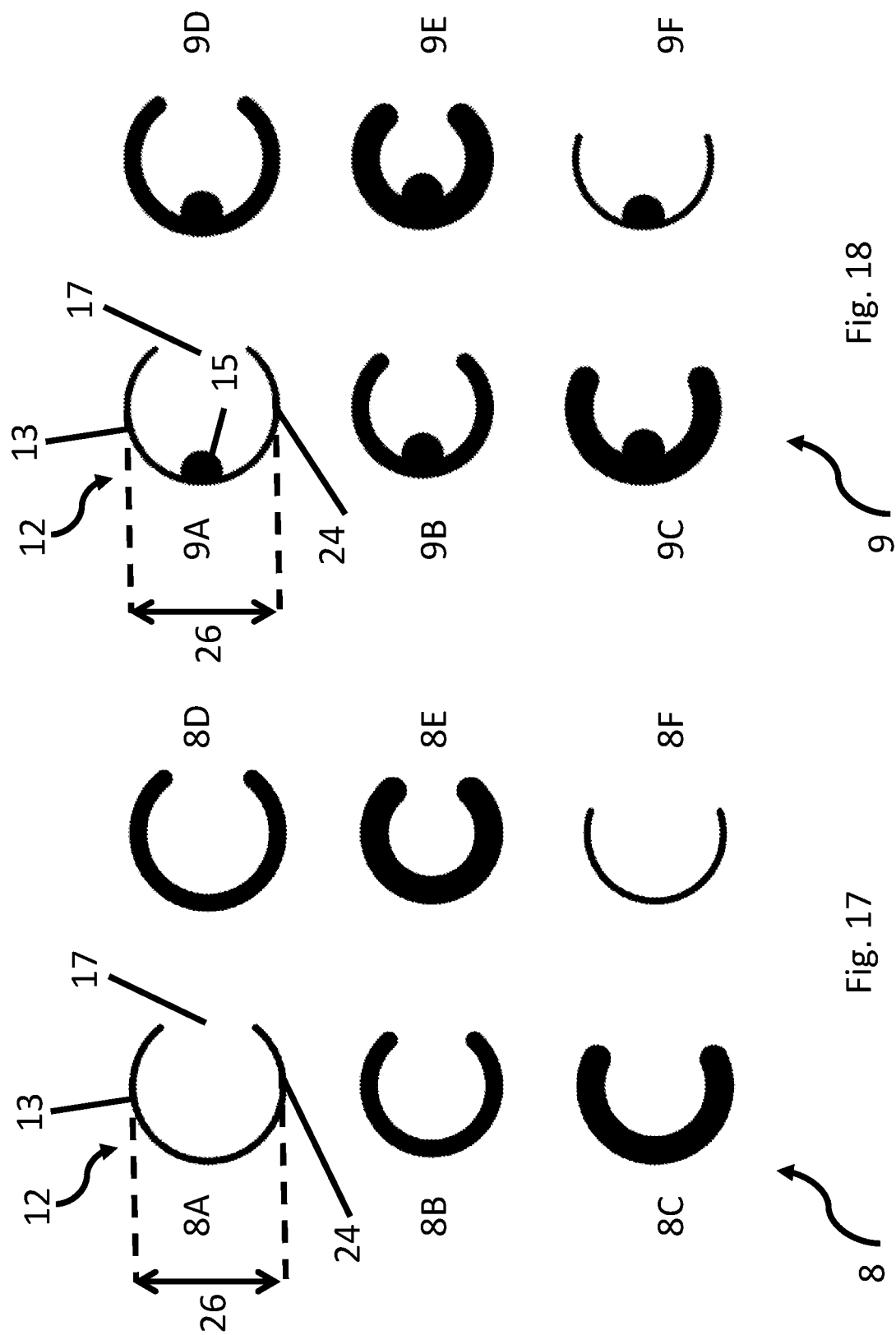

ARRANGEMENT FOR RECOGNITION BY A TOUCH-SENSITIVE SENSOR MATRIX

PRIORITY APPLICATIONS

This application is a U.S. National Stage Filing under 35 U.S.C. § 371 from International Application No. PCT/EP2020/077195, filed on Sep. 29, 2020, and published as WO2021/063927 on Apr. 8, 2021, which claims the benefit of priority to European Application No. 19200825.8, filed on Oct. 1, 2019; the benefit of priority of each of which is hereby claimed herein, and which applications and publication are hereby incorporated herein by reference in their entireties.

The present invention relates to an arrangement that is detectable by a touch-sensitive sensor matrix, such as a touch-sensitive screen. The arrangement comprises an electrically conductive structure and an electrically insulating substrate material on which the structure is applied or in which the structure is embedded. Further, the invention includes a group of such arrangements, a method of manufacturing an arrangement, a system including the arrangement and a control and processing unit, and a method of recognizing the arrangement on a touch-sensitive sensor matrix or screen.

Nowadays, touch-sensitive screens (touchscreens) are used in various fields. Touch-sensitive screens are used, for example, in smartphones, tablet PCs and in a wide variety of machines. One advantage of these touch-sensitive screens is that both an input and an output can be made via the screen. Touch-sensitive screens are typically able to detect where the screen is touched with a finger.

In many touch-sensitive screens, capacitive touchscreens are used. In these cases, two grids of transparent electrical lines, aligned transversely to one another, are typically disposed in a glass. The upper of the two line grids continuously sends electrical signals to the lower grid. When the screen is touched with a finger, an electrical capacitance of the insulating layer disposed therebetween changes, and a signal becomes weaker at that point. A processor then calculates a position where the signal dropped off and relays the location and duration of the touch to software on the device. This in turn then performs a corresponding action in response to the touch.

Such capacitive touch-sensitive screens, which can often also detect a large number of touches simultaneously (multi-touch displays) are usually not designed to detect objects placed on the touch-sensitive screen. On the contrary, such systems typically include filters to actively filter out touch data triggered by the objects.

Various active and passive input units detectable by a touch-sensitive screen or methods in which passive input units are detectable by a touch-sensitive screen are proposed in the literature. For example, US 2010/0149119 A1 relates to an information processing device that monitors a capacitance change of a capacitive touchscreen. The change in capacitance is caused by a conductive material in which pattern information, such as a QR code, can be encoded.

For smooth operation of a touch-sensitive screen using an input unit, at least one or two or more of the following conditions should be met:
1. It should be possible to determine whether input units are currently on the touch-sensitive screen or not, regardless of whether they are touched by a user or not, and regardless of their position and orientation on the touch-sensitive screen.
2. Each input unit should be uniquely identifiable.
3. An exact position and/or orientation of the input unit or units on the screen should be determinable.
4. A change in the position and orientation of fast-moving input units should be detectable without noticeable delay.

It has been found that many systems shown in the prior art are unable to satisfy at least one, or more than one, or all of these four conditions satisfactorily.

In certain embodiments of a touch-sensitive screen, the touch-sensitive screen is provided with electrode lines in rows and columns, each row including a control line and each column including a readout line. With this so-called sensor matrix, a capacitance can be measured by exciting each control line in turn with an electrical pulse and measuring the response on each readout line. This measurement method is generally referred to as mutual capacitance measurement. The corresponding sensors are typically called mPCAP (mutually projective capacitive touch) sensors. The objective of counter capacitance measurement is to measure the change in capacitance between a control line and a readout line, which can indicate the presence and extent of a touch. However, the charge from a touch that is not fully grounded may pass from the control line to the readout line instead of fully passing to ground, which may distort the measurement signal. This effect is referred to in the literature as retransmission. Retransmission may even occur when two fingers of a person are put down.

Retransmission in a touch-sensitive screen can cause several effects. First, retransmission can cause a touch sensor control unit to interpret a single large touch as multiple touches. Second, retransmission can reduce the touch amplitude of a signal, reducing the accuracy of touch position estimation. For example, the touch sensor control unit may misinterpret a touch in the upper left portion of the touch sensitive screen as a touch in the upper center portion of the touch sensitive screen. Third, retransmission can reduce the values of the touch amplitude in such a way that a so-called "anti-touch" with negative amplitudes is generated.

These retransmission effects are mostly considered detrimental in the literature and in the state of the art. For example, the publication U.S. Pat. No. 9,335,873 B2 attempts to compensate for the effects of retransmission described above.

In the book "Projected Capacitive Touch—a practical guide for engineers" by Tony Gray, Springer 2019, ISBN 978-3-319-98391-2, retransmission is described in more detail in chapters 17 and 18.

It is the object of the invention to propose an arrangement that can be reliably detected and recognized by a touch-sensitive sensor matrix. It is also an object of the invention to provide a method for detecting the arrangement on a touch-sensitive sensor matrix that is capable of at least partially overcoming the disadvantages of the prior art.

The object is solved by an arrangement having the features of the main claim, a group of arrangements, and a system comprising the arrangement and a control and processing unit having the features of the auxiliary claims. Further, a method for manufacturing the arrangement and a method for recognizing the arrangement on a touch-sensitive screen are proposed. Further embodiments result from the features of the dependent claims as well as from the description and the figures.

According to the invention, there is provided an arrangement for detection by a touch-sensitive sensor matrix comprising at least one electrically conductive structure, said structure having an annular touch surface (annular contact surface) and at least one marker, and an electrically insulating substrate material on which the structure is applied or in which the structure is embedded.

In particular, the electrically conductive structure is designed, when the arrangement is placed on the touch-sensitive sensor matrix, to cause capacitance changes which are detectable as sensor data by capacitive sensors of the touch-sensitive sensor matrix, especially even when the arrangement is not touched by a user. In many cases, a plurality of touch-sensitive sensors arranged side by side is provided, which may also be referred to as a sensor arrangement or sensor matrix. An input can then be made, for example, by placing the arrangement on the sensor matrix or contacting the sensor matrix through the arrangement. If output to a user is additionally desired, an output unit such as a display screen may be provided. The sensor matrix may be a component of a touch-sensitive screen, typically allowing output via the screen. However, output via the screen is not mandatory. A different type of feedback to the user is also conceivable, e.g. a different visual, an auditory or a haptic feedback. Since a touch-sensitive screen is often used in practice, this term is often used in the following. As used herein, the terms "touch-sensitive sensor matrix" and "touch-sensitive screen" may be used interchangeably. In certain embodiments, the sensor matrix is rectangular. The sensor matrix can be formed by M columns and N rows, in which case the number of sensors is M*N.

Electrically conductive material, which may also be referred to as electrically conducting material, that rests on a sensor matrix or touch-sensitive screen and extends across multiple electrode lines (or wires) of the sensor matrix can cause capacitive coupling to other electrode lines, particularly horizontal electrode lines, that are connected to ground. They cause a similar signal change as fingers. However, with a lower signal-to-noise ratio, typically from 1:3 to 1:20, since the sensor glass of the touch-sensitive screen has to be overcome twice. The signal of the control line must cross the sensor glass once at the control line and once at the readout line. The sensor matrix may include a plurality of touch-sensitive capacitive sensors. Furthermore, the sensor matrix can be designed for simultaneous detection of multiple touches ("multi-touch").

The inventors have realized that the retransmission effects described above can be exploited to provide improved detection or recognition of the arrangement. Indeed, the same phenomenon of retransmission can also occur in electrically conductive structures, and can trigger characteristic signals in the touch-sensitive sensor matrix or touch-sensitive screen. When the electrically conductive structure is touched, the opposite signal triggered by retransmission is weaker than the positive signal at crossing points of the electrode leads, which are covered by the electrically conductive material of the structure. If the electrically conductive pattern is not touched, both signals are approximately equally strong, since both signals have to pass through the sensor glass (glass pane) of the touch-sensitive screen twice. This can cause rectangular shapes, when placed parallel to the sensor matrix, to cancel all signals if there is no other capacitive coupling to ground, such as via a human.

Thus, the electrically conductive structure can cause a characteristic capacitance pattern in the touch-sensitive screen.

The inventors have realized that two conditions should be met to enable reliable detection of the electrically conductive structure of the arrangement by the sensor matrix or touch-sensitive screen, on the one hand, and identification of the electrically conductive structure, on the other hand. Identifying the electrically conductive structure can be particularly important when using or placing multiple electrically conductive structures on the sensor matrix or screen.

First, a range of changes in the capacitive images triggered by the conductive structure should be as independent as possible of the orientation, i.e., the angle of rotation, of the electrically conductive structure relative to the sensor matrix. This area can be used for coarse detection of the arrangement and/or positioning of the arrangement on the screen.

Further, an orientation of the conductive structure should be resolvable. Other regions of the electrically conductive structure should change upon rotation of the electrically conductive structure in a manner that does not result in similarities to other variations of the electrically conductive structure, even upon rotation, so that the electrically conductive structures remain distinguishable regardless of the orientation of the electrically conductive structure on the touch-sensitive screen.

The first condition can be ensured by the mentioned annular touch surface of the arrangement. The annular touch surface results in the locations on the touch-sensitive screen where the arrangement rests being easily found (for example, with thresholding, contour detection, template matching, and/or temporal change) because a characteristic touch pattern is created in a square of the sensor matrix encompassing the annular touch surface outside the annular touch surface or in an area within the annular touch surface that does not depend, or depends relatively little, on the orientation or angle of rotation of the arrangement relative to the sensor matrix. The annular touch surface can be designed such that in the center of the annular touch surface, where there is no electrically conductive material, for example, one or more negative signals are triggered in the sensor matrix. An imaginary square area of the sensor matrix with a width or length corresponding to the diameter of the annular touch surface can be defined. This imaginary square surface can be placed around the annular touch surface when the sensor matrix is trouched (contacted) by the arrangement, so that the imaginary square surface surrounds the annular touch surface. The corner points of the square surface then lie outside the annular touch surface. In at least one corner point or in all corner points of this square area, negative signals can be triggered in the sensor matrix by the annular touch surface. Both the center of the annular touch surface and the corner points of the square area do not depend on the orientation of the arrangement on the sensor matrix. Thus, these orientation-independent characteristic signals can be used to detect the position of the arrangement on the sensor matrix.

The second condition can be satisfied by the claimed marker of the electrically conductive structure. Thus, the marker can be used to determine the orientation of the arrangement on the screen. In addition, the marker may be configured to distinguish the electrically conductive structure from other electrically conductive structures and thus, in particular, to distinguish the arrangement from arrangements having different markers.

In one embodiment, the marker comprises or is at least one further touch surface (touch surface). The marker designed as a touch surface can therefore be provided in addition to the annular touch surface. The further touch surface can, in particular, be electrically conductively connected to the annular touch surface. This can increase the signal strength or improve the signal-to-noise ratio.

The further touch surface can, for example, be arranged within the annular touch surface. In particular, the outline of the electrically conductive structure may be the same for each arrangement when a plurality of arrangements are used. In this embodiment, the touch-sensitive screen can recognize relatively quickly from the outline of the electrically conductive structure that it is a pre-known arrangement. The differentiation of the arrangement from other arrangements (identification of the arrangement) can then be made via the provided marker, which is preferably located within the annular touch surface or is part of the annular touch surface.

For example, the marker includes at least two touch surfaces. By providing at least two touch surfaces, the number of arrangements that can be distinguished from one another can be increased. The at least two touch surfaces can be arranged at an angle to each other. An exemplary marker includes a first touch surface and a second touch surface. A first imaginary straight line passes through the center of the annular touch surface and the center of gravity of the first touch surface. A second imaginary straight line passes through the center of the annular touch surface and the center of gravity of the second touch surface. In particular, the first straight line and the second straight line can form an angle smaller than 180° and/or larger than 0°.

A center angle between the first touch surface and the second touch surface on the annular touch surface may be greater than 10° and/or less than 180°. In particular, angles greater than 20° are considered, since smaller angles can make it difficult to resolve the touch surfaces. A circumferential distance between the first touch surface and the second touch surface on the annular touch surface is preferably greater than 5 mm. A circumferential distance between the first touch surface and the second touch surface on the annular touch surface may be greater than the distance between adjacent sensors of the sensor matrix. Typically, the distance between adjacent sensors of the sensor matrix is greater than 5 mm, e.g. 7 mm.

The marker may include at least two differently sized touch surfaces and/or two differently shaped touch surfaces. In this context, the shape is to be understood as constant if the ratio of widths and lengths of the touch surface remains the same when the touch area is increased or decreased. The touch surfaces of the marker can thus have a different size for the same shape and/or a different shape for the same size.

The at least one touch surface may adjoin the annular touch surface. It may be provided that a perimeter of the touch surface of the marker is bounded by an arc of the annular touch surface.

Typically, a ratio of conductive area to non-conductive area within the annular touch surface is less than 0.8, in particular less than 0.6, preferably less than 0.3. This can simplify identification of the marker by the touch-sensitive screen. In fact, if the ratio for two different arrangements is greater than 0.8, for example, the markers of these arrangements may no longer be kept apart and distinguished from each other.

An outer diameter of the annular touch surface is preferably matched to the sensor wire spacing (electrode lead spacing) in the touch-sensitive screen. The outer diameter should be slightly larger than the sensor wire spacing. The sensor wire spacing for most touch-sensitive screens, in turn, is such that a fingertip with a width of about 10 mm can be reliably detected. Most capacitive touch-sensitive screens have sensor wires that are spaced about 5 mm to 8 mm apart, e.g. 7 mm. An outer diameter of the annular touch surface can therefore be, for example, at least 10 mm. A maximum value of the outer diameter is not limited in principle, but should be smaller than the horizontal or vertical dimensions of the touch-sensitive screen. A width of the annular touch surface may be smaller than a largest extent of the at least one touch surface of the marker. Further, an area enclosed by the annular touch surface may have a diameter of at least 7 mm, preferably at least 10 mm or at least 20 mm. This surface is circular, except for any markers in the form of touch surfaces.

As indicated above, the marker may be configured to break the rotational symmetry of the annular touch surface or electrically conductive structure. Despite the annular touch surface, in some embodiments the electrically conductive structure has no axis of rotational symmetry and/or at most a $C_S$ symmetry (mirror symmetry) due to the marker, i.e., the two-dimensional touch pattern of the electrically conductive structure has no rotational symmetry. Mirror-symmetric structures allow very easy detection of the mirror axis and thus the position of the structure in the direction perpendicular to the mirror axis. When there is mirror symmetry, machine learning can thus be simplified and accelerated.

The marker can also be formed by an annular width of the annular touch surface, i.e. the difference between the outer radius and the inner radius. In this case, the annular touch surface can be identified by its annular width and distinguished from other annular touch surfaces. The annular width should be at least 2 mm and/or can be at most 50%, preferably at most 20% of the outer diameter of the ring-shaped touch surface. In some embodiments, the annular width is no more than half the outer diameter minus 5 mm. Additionally or alternatively, the marker can be given by the diameter of the annular touch surface. In this case, the annular touch surface can be identified by its diameter and distinguished from other annular touch surfaces. The diameter here should be at least 10 mm. In practice, the size of the sensor matrix is typically an upper limit for the diameter mentioned.

The marker may comprise or be an opening of the annular touch surface as an alternative or in addition to the touch surface described above. In this case, the touch surface can be C-shaped or horseshoe-shaped. Said opening may, for example, have an opening angle of at least 5° and/or at least 10° and/or at least 20° and/or at least 30°. Said opening may have an opening angle of at most 150° and/or at most 120° and/or at most 90° and/or at most 60° and/or at most 45° and/or at most 40° and/or at most 35°. How large or small the opening angle can be selected depends on the sensitivity of the touch-sensitive screen. The maximum value of the opening angle is to ensure that the annular touch surface can still be recognized as such. The minimum value of the opening angle depends on the sensitivity of the sensor matrix, e.g. a sensor wire spacing of the sensor matrix.

To increase the number of identifiable arrangements, at least two of the above markers can be combined. Here, one of the markers may be provided for determining the orientation of the electrically conductive structure on the screen, while another marker is provided for distinguishing the arrangement from other arrangements.

In addition, a plurality of electrically conductive structures may be provided, each having an annular touch surface and at least one marker. Thus, in this case, the arrangement comprises at least two annular touch surfaces and at least two markers. The number of markers is preferably greater than or equal to the number of electrically conductive structures or the number of annular touch surfaces. In particular, each electrically conductive structure may be associated with at least one marker. Further, each pair of electrically conductive structures may have a further marker associated with it.

If the arrangement has at least two electrically conductive structures, at least one further marker can be provided, which is characterized by the distance and/or orientation (angle of rotation) of the electrically conductive structures relative to one another. In one embodiment, the electrically conductive structures are the same in terms of shape and/or size. This can significantly reduce the amount of data to be acquired for machine learning, since only a few shapes of the electrically conductive structures need to be learned and different combinations of the marker allow a large number of distinguishable objects. For example, two identical C-shaped touch surfaces may be provided that do not differ in shape and size. An angle of rotation of the Cs relative to each other can be used as a marker to distinguish the arrangement from other arrangements.

The electrically conductive structure may be substantially a flat, two-dimensional structure. In other words, a thickness of the electrically conductive structure may be at least a factor of 10 smaller than a length and/or width of the structure. The thickness depends in particular on the materials used. If paint, ink or a varnish is used as an electrically conductive structure, a typical thickness of the electrically conductive structure is about at least 0.01 mm and/or at most 0.1 mm. If an ITO material is used, a thickness of at least 5 nm and/or at most 500 nm can be considered.

The electrically conductive structure may comprise or be an electrically conductive paint or varnish. The electrically conductive structure can be screen-printed onto the substrate material, for example.

In one embodiment, the arrangement and/or the structure and/or the substrate material have an optical transmittance of at least 75% in the visible wavelength range 400 nm-700 nm. Typically, the transmittance is at least 80%, especially at least 85%.

In a further embodiment, the electrically conductive structure may particularly comprise or be indium tin oxide (ITO). An ITO typically has an optical transmittance in the range of 80% to about 90%. ITO is available as a thin plastic film that is electrically conductive on one side and electrically insulating on the other. An ITO can be processed with a laser cutter, for example.

In other embodiments, the electrically conductive structure comprises or is, for example, a metal foil or a metal plate, which may be particularly thin. Suitable electrically conductive materials would be, for example, copper, aluminum or stainless steel.

The electrically conductive structure can be printed, glued or otherwise applied to the substrate material. The electrically conductive structure can, for example, be materially, positively and/or non-positively bonded to the substrate material.

The substrate material may comprise or be plastic. The substrate material includes, for example, a polymeric material such as PET, polyacrylate, or polycarbonate. The choice of substrate material may depend on the material of the electrically conductive structure. If, for example, electrically conductive paint is used that is cured at 60° C. to 100° C., the substrate material must be able to withstand this temperature. Polycarbonate, for example, remains chemically stable at a temperature of 60° C. Other materials such as textile, paper or cardboard are also conceivable substrate materials.

The arrangement may have a protective layer covering the electrically conductive material and the substrate material. A thickness of the protective layer should be chosen such that detection of the electrically conductive structure through the protective layer is still possible. The substrate material can also be designed as a protective layer.

The assembly may include a fastening means configured to fasten the arrangement to a further member other than the arrangement. The fastening means may be arranged, for example, on a side of the arrangement opposite the electrically conductive structure. The fastening means can also be located on the side of the electrically conductive structure, e.g. if the substrate material is designed as a protective layer. The substrate material can thus be arranged either on the bottom side or on the top side of the arrangement. The bottom side is typically used for contacting the sensor matrix/touch-sensitive screen. The bottom side of the arrangement is typically substantially flat, i.e., a substantially two-dimensional structure with no major elevation or depression. In one embodiment, the arrangement has an adhesive layer as a fastening means.

The arrangement described above can be produced, for example, by means of the following process.

The method of making the arrangement comprises the steps of:
providing an electrically insulating substrate material,
applying an electrically conductive material to or into the substrate material,
forming the electrically conductive structure,
forming the arrangement.

In an advantageous embodiment, the electrically conductive material is an electrically conductive paint or varnish. In this case, the electrically conductive material can be applied to the substrate material by means of screen printing, for example. Materials that can be used in a screen printing process are then considered for the substrate material. When using an electrically conductive coating agent, such as paint or varnish, it can be applied to the substrate material by rolling, brushing and/or spraying.

Alternatively, the electrically conductive material can be applied to the substrate material as a layer or as a prefabricated layer, covering it partially or completely, for example. The electrically conductive structure can be formed by removing part of the electrically conductive layer, in particular by scraping or laser cutting away. The electrically conductive layer can be formed from an ITO (see above).

Alternatively, the electrically conductive layer or structure or the electrically conductive material is bonded to the substrate material.

The electrically conductive structure can, for example, be materially, positively and/or non-positively bonded to the substrate material.

In addition, the invention proposes a group of arrangements. Each arrangement of the group has a differently designed electrically conductive structure. For example, each electrical structure has a differently configured marker and an identical annular touch surface. In one embodiment, the outline or perimeter of each electrically conductive structure of the group is the same, and in particular may be formed by the outline or perimeter of the annular touch surface. The respective different markers can then be provided within the annular touch surface. Each arrangement of the group may be characterized by a different circumferential distance or center angle of the first and second touch surfaces relative to each other. Each arrangement of the group may be configured by a specific size or shape of the touch surfaces within the annular touch surface. In particular, each arrangement of the group may be configured to generate a characteristic touch pattern in the sensor matrix or screen that is different from the touch patterns of the other arrangements of the group. The touch pattern can also be referred to as the capacitance pattern. Each arrangement of the group can alternatively also have at least two electrically conductive structures, which are identical in terms of shape and size, but can be distinguished by an angle of rotation and/or distance relative to each other. In this respect, therefore, an additional marker is provided which comprises the angle of rotation and/or the distance.

It should be emphasized that features mentioned, for example, only in relation to the arrangement can also be claimed for the arrangements of the group and vice versa. Further, the group of arrangements can also be manufactured using the manufacturing processes described above.

An input element for a touch-sensitive sensor matrix and/or a touch-sensitive screen is also proposed. The input element has a housing and the arrangement described above, the arrangement being arranged on a bottom side of the housing. The arrangement can be attached to the housing in such a way that the electrically conductive structure touches (contacts) the sensor matrix or the touch-sensitive screen when the input element is placed on it, or at least causes capacitance changes in the sensor matrix or the touch-sensitive screen. The input element can be designed as a passive input element without electronics and without power supply. Alternatively, the input element can be designed as an active input element with electronics and/or power supply. Example active input elements are shown in publication WO 2018/134418 A1.

Also proposed is a system comprising the arrangement described above. The system also features a control and processing unit for a sensor matrix or touch-sensitive screen. The control and processing unit includes, for example, a communication unit, a processor, and/or a memory.

As indicated above, the electrically conductive structure of the device is configured to cause capacitance changes when the arrangement is placed on a touch-sensitive sensor matrix or touch-sensitive screen, which are detectable as sensor data by capacitive sensors of the sensor matrix or touch-sensitive screen. The control and processing unit is designed to receive the sensor data and recognize the arrangement based on the electrically conductive structure.

The control and processing unit can be set up to receive sensor data detected by means of capacitive sensors of the sensor matrix or the touch-sensitive screen. The capacitive sensors can detect capacitance changes caused by the electrically conductive structure of a device contacting the screen or by an arrangement placed on the screen. This detection typically involves a spatially resolved determination of the magnitude of the capacitance changes thus caused.

Optionally, the control and processing unit then creates a capacitance pattern for the electrically conductive structure of the arrangement, the capacitance pattern including a spatially resolved representation of at least two different magnitude capacitance changes or at least three pairwise different magnitude capacitance values or quantities derived therefrom. The capacity capacitance pattern can then be stored in the memory.

The capacitive sensors enable detection of magnitudes of capacitance changes triggered at different locations in different magnitudes by the electrically conductive structure. Thus, magnitudes of capacitance changes at different locations can be mapped in the capacitance pattern, similar to a grayscale image, rather than just one location where a capacitance change occurs. Thus, as mentioned, the capacitance pattern includes at least two capacitance changes of different sizes at different locations and includes their relative positions, for example, their spacing. Thus, the at least two different capacitance changes typically contain at least the information from two different black and white images with different capacitance change thresholds. In possible embodiments, the capacitance patterns are stored as a grayscale image with at least two gray levels or as at least two black and white images with different thresholds.

For example, adaptive thresholding methods can be used to set the thresholds, whereby a threshold value for a pixel is calculated from signals from the pixel's surroundings. In particular, such methods allow detection of multiple arrangements (this possibility is explained in detail below) if their electrically conductive structures emit signals of different strengths due to their design or due to their orientation with respect to the grid of the touch-sensitive screen. Using Adaptive Thresholding, it is also possible by to detect different areas of a single arrangement, where the electrically conductive structure of the arrangement generates signals of different strengths, with a different threshold.

The touch-sensitive screen may be set up to detect capacitance changes of 10 pF or less. For example, in possible embodiments capacitance changes of 3 pF, preferably of 1 pF, particularly preferably of 0.1 pF are detectable. For example, a glass thickness of the touch-sensitive screen may be 4 mm or less.

Thus, the capacitance pattern captures a differentiated characteristic image of the electrically conductive structure, which on the one hand is a recognition feature, similar to a fingerprint, and on the other hand enables tracking of the arrangement on the screen and detection of an orientation of the arrangement on the screen. An analysis and processing of the capacitance pattern thus stored or tracked can be performed by the control and processing unit using methods of image processing. To determine the described capacitance pattern, the positions of the induced capacitance changes are recorded at least relative to each other.

It may happen, for example, that the annular touch surface triggers a stronger signal than the marker. The control and processing unit may then be configured to determine, in a first step, that the annular touch surface contacts (touches) the touch-sensitive screen. By comparison with previously known capacitance patterns, the annular touch surface can be identified by its annular outline and/or its characteristic capacitance pattern. This makes it possible to determine relatively quickly that an arrangement is resting on and/or contacting the screen at all. It can also be used to determine the position of the arrangement on the screen as a first approximation. The marker can be detected and recognized by another measurement with a different threshold value. The identity of the arrangement or marker can then be determined by comparison with previously known patterns. With the help of the marker it is also possible to determine an orientation (angle of rotation) of the arrangement on the screen.

Typically, capacitance changes triggered by a single arrangement are detected at at least five locations or at least five intersections of the sensor matrix. The number can be at least 10 and/or at least 20 locations or intersections.

For example, with a resolution of at least 1 pixel per 35 $mm^2$, preferably with a resolution of at least 1 pixel per 15 $mm^2$, particularly preferably with a resolution of at least 1 pixel per 6.8 $mm^2$. For example, the touch-sensitive screen may have a screen diagonal of between 10 and 100 inches.

In one embodiment, the touch-sensitive screen has a screen diagonal of 55 inches, with dimensions of 1220 mm×680 mm, and has 172×105 pixels where sensor data can be collected and thus the conductive structure of the arrangement can be detected. A sensor area divided by the number of crossing points can provide a measure of sensitivity.

As mentioned at the beginning, capacitive sensors can detect certain structures or objects even if they are not touched (passive). It has been found that with the proposed control and processing unit for the touch-sensitive screen, conductive structures of the above-described arrangement can be detected and their capacitance pattern can be recorded even if the arrangement is not touched. This is achieved in particular by the design of the capacitance pattern and the use of the capacitive sensors described here.

The proposed control and processing unit may be adapted to also determine a position of the arrangement put down on the touch-sensitive screen when the arrangement has been put down on the screen. In addition to the determination of a relative position of the capacitance changes caused by the arrangement, which is necessary for the capacitance pattern, this also includes a determination of an absolute position of the input unit on the touch-sensitive screen. For this purpose, at least one point of the capacitance pattern is assigned to a location on the touch-sensitive screen where the corresponding capacitance change occurs. For this purpose, a grayscale image or one or more black-and-white images can be captured accordingly, covering not only the area in which the capacitance changes are caused, but encompassing the entire screen. Typically, a position of an outline or outer edge of the annular touch surface on the screen is detected for determining a position. For example, the position of the outline can be extracted from one of several captured black and white images. For example, detection of the outline can be done from the black and white image with the lowest threshold value.

From black and white images with a higher threshold value, in which the electrically conductive structure is detected in relation to the entire screen, an orientation of the arrangement can then be detected with the aid of the marker in addition to the position. Depending on the threshold value, a different contrast and level of detail is achieved, so that it is possible to better resolve the electrically conductive structure by using additional threshold values.

The proposed control and processing unit makes it possible to detect different structures of different arrangements. Since the capacitance changes triggered by the different structures of the different arrangements may differ from each other, it is typically provided that the control and processing unit is configured to respond to the different degrees of capacitance changes. It may be provided that in a first detection step the control and processing unit is adapted to use predefined threshold values for the capacitance changes.

The control and processing unit can be set up to compare detected capacitance patterns of the arrangement with previously known capacitance patterns. For example, in a first step, the control and processing unit can record a rough capacitance pattern with few threshold values. This can lead to improvements in speed. Recorded capacitance pattern can be compared to the known capacity patterns, where the known capacity patterns were recorded using machine learning methods, for example. This then allows, for example, a determination of the annular touch surface and/or a determination of a type of the arrangement. This means that the arrangement does not have to be measured completely when it is laid out, but only up to the point where it is possible to assign it to a previously known type or arrangement.

Data that may be present in memory for previously known arrangements may include, for example, typical capacitance changes caused during the putting down and also other data that may be helpful in using the control and processing unit. For example, it may be stored what type of capacitance changes are characteristic of a particular arrangement during putting down, release, rotation, or lifting off. For example, the control and processing unit has information about what signals a particular arrangement triggers when it is released or moved or rotated, and/or information about how a signal triggered by an arrangement changes depending on its orientation.

The control and processing unit may be arranged to determine an orientation of the arrangement from the capacitance pattern, in particular based on the marker of the electrically conductive structure. As mentioned, the position of the arrangement is detected by extracting the absolute position of the capacitance changes caused by it with respect to the overall dimensions of the touch-sensitive screen from the sensor data. For example, while determining position requires a single low threshold black and white image or a use of the lowest threshold of a grayscale image, determining orientation may require the use of multiple images or grayscale values or the selection of one from multiple images.

For this purpose, it is advantageous if a pattern with broken, preferably low symmetry or rotational symmetry is recognizable on the black and white image used to determine the orientation or within the grayscale used to determine the orientation due to the capacitance changes. Since some of the markers of the arrangement described above break the rotational symmetry of the annular touch surface, the marker is preferably used to determine the orientation of the arrangement. The marker is designed in such a way that the arrangement can be distinguished from other arrangements even when the arrangement is rotated. In other words, the arrangements can be distinguished from each other by providing different markers. Further, the marker allows in particular a distinction of different rotational positions of a single arrangement. Thus, the orientation of the arrangement relative to the sensor matrix can be determined using the marker.

By using pre-known data generated by machine learning, it can be known a priori for a given arrangement which threshold is suitable to obtain such patterns with the lowest possible symmetry. Symmetries do not then need to be re-examined for a reissued arrangement, but only the identification described above needs to be made. Typically, the arrangement is touched at least during putting down and movement, so that at least then detection of the electrically conductive structures can be simplified. This aspect can also be exploited here. However, it should be emphasized that the arrangement is preferably designed to eliminate the need for the user to touch the device.

The control and processing unit proposed herein may be arranged to track rotations and/or translations of the arrangement on the screen when the arrangement has been placed on the screen. This can be done similarly to the position determination described above by evaluating the sensor data.

As mentioned, it is possible for the control and processing unit to detect multiple arrangements simultaneously, such as the group of arrangements mentioned above. Possible further arrangements then typically have differently designed electrically conductive structures as the arrangement described above, which may be referred to as the first arrangement, and interact with the control and processing unit in the same way.

In this way, it can be determined whether a further object put down on the screen is the at least one further arrangement, and thus it can be verified whether the at least one further arrangement has been put down on the screen.

For the electrically conductive structure of the further arrangement, a capacitance pattern is then also created, stored and/or compared with previously known capacitance patterns.

The arrangements are then typically assigned via the differently designed electrically conductive structures, in particular via the differently designed markers.

The control and processing unit may be arranged to control the touch-sensitive screen based on the sensor data or to receive input signals from the touch-sensitive screen, particularly when the arrangement has been placed on the screen.

Another system proposed herein includes a touch-sensitive screen, in particular the touch-sensitive screen described previously, a control and processing unit, in particular the control and processing unit described previously, and an arrangement, in particular the arrangement described previously.

In such a system, the touch-sensitive screen includes capacitive sensors for collecting sensor data. The touch-sensitive screen can be designed as a table, with the screen forming the tabletop, for example. The arrangement comprises an electrically conductive structure that, when the device is placed on a touch-sensitive screen, causes local capacitance changes that are detectable by the capacitive sensors of the touch-sensitive screen.

The control and processing unit is set up to use the capacitance changes to check whether contacting or putting down of the arrangement has been detected. The control and processing unit may create and store a capacitance pattern for the conductive structure of the input unit, the capacitance pattern including a spatially resolved representation of at least two different magnitude capacitance changes or at least three pairwise different magnitude capacitance values or quantities derived therefrom.

It should be noted that the system may also include multiple sensor matrices or touch-sensitive screens, for example, two touch-sensitive screens or ten touch-sensitive screens. The one or more touch-sensitive screens may each be connected to the control and processing unit by cable or, for example, if they are located further away from the control and processing unit or cables are undesirable, also by wireless connection, such as a Wifi, Bluetooth, or a cellular network. The control and processing unit is then typically set up to interact with the additional screens in the same way as with the first touch-sensitive screen. In such scenarios, it is additionally possible that an interaction between the multiple screens is also provided, i.e., an action affecting a first of the multiple touch-sensitive screens triggers another action relating to another of the multiple touch-sensitive screens.

A method of using a touch-sensitive sensor matrix as defined in this application, or a system as described above, comprises at least the following steps:
  detecting capacitance changes by capacitive sensors of a touch-sensitive sensor matrix, wherein the capacitance changes are caused by an electrically conductive structure of an arrangement contacting the sensor matrix.
  creating a capacitance pattern for the conductive structure of the arrangement.
  comparing the recorded capacitance pattern with previously known capacitance patterns.
  recognizing the arrangement on the touch-sensitive sensor matrix.

In particular, the sensor matrix can be part of the touch-sensitive screen described previously.

In other words, sensor data can be generated using capacitive sensors of the sensor matrix or touch-sensitive screen. The capacitance changes detected with the capacitive sensors can be stored as sensor data. Contacting (touching) the sensor matrix or the screen by the arrangement can be achieved, for example, by placing the arrangement on the sensor matrix or the touch-sensitive screen.

In particular, the capacitance pattern contains a spatially resolved representation of at least two capacitance changes of different magnitude or at least three capacitance values of different magnitude in pairs or quantities derived therefrom. The capacitance pattern can also be stored.

Further steps of the method include, for example:
  detecting, based on the annular touch surface of the arrangement, a position of the arrangement on the sensor matrix or touch-sensitive screen, and/or
  detecting, based on the marker of the arrangement, an orientation of the arrangement on the sensor matrix or touch-sensitive screen.

The object formulated at the beginning is also solved by such a method. The method makes it possible to verify an identity of an arrangement placed or put down on a touch-sensitive sensor matrix or touch-sensitive screen, to determine its location and/or orientation on the sensor matrix or screen, and to provide different arrangements for the sensor matrix or touch-sensitive screen, in particular by inputs via movements of the arrangements on the sensor matrix or touch-sensitive screen.

It should be emphasized that features mentioned, for example, only in relation to the arrangement, the control and processing unit and/or the system can also be claimed for said method and vice versa.

For a possible detection of the arrangement and/or the input element by the sensor matrix or the touch-sensitive screen, reference is made in addition to European patent applications EP 18 168 536.3 and EP 18 701 453.5.

Figure 1:
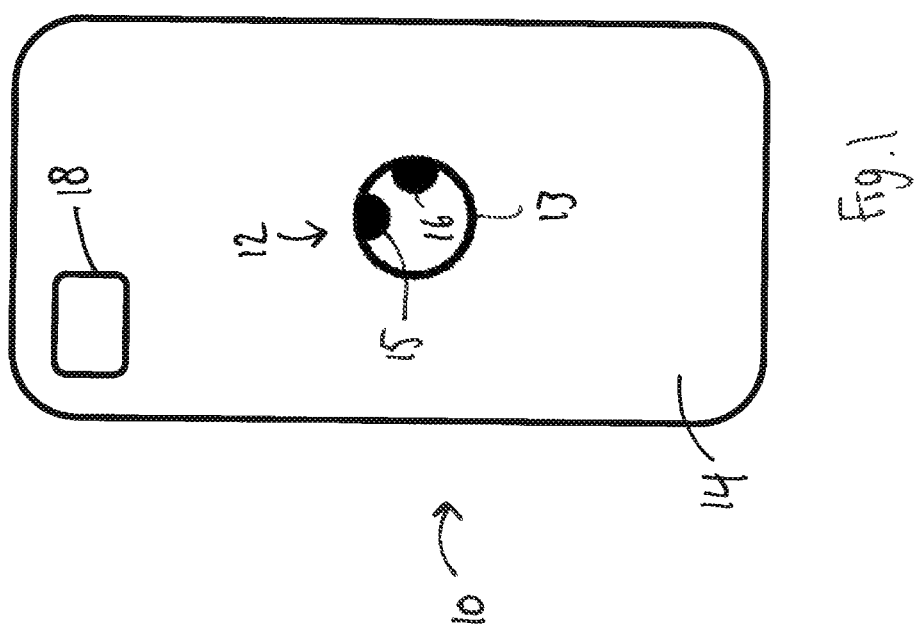
Figure 5:
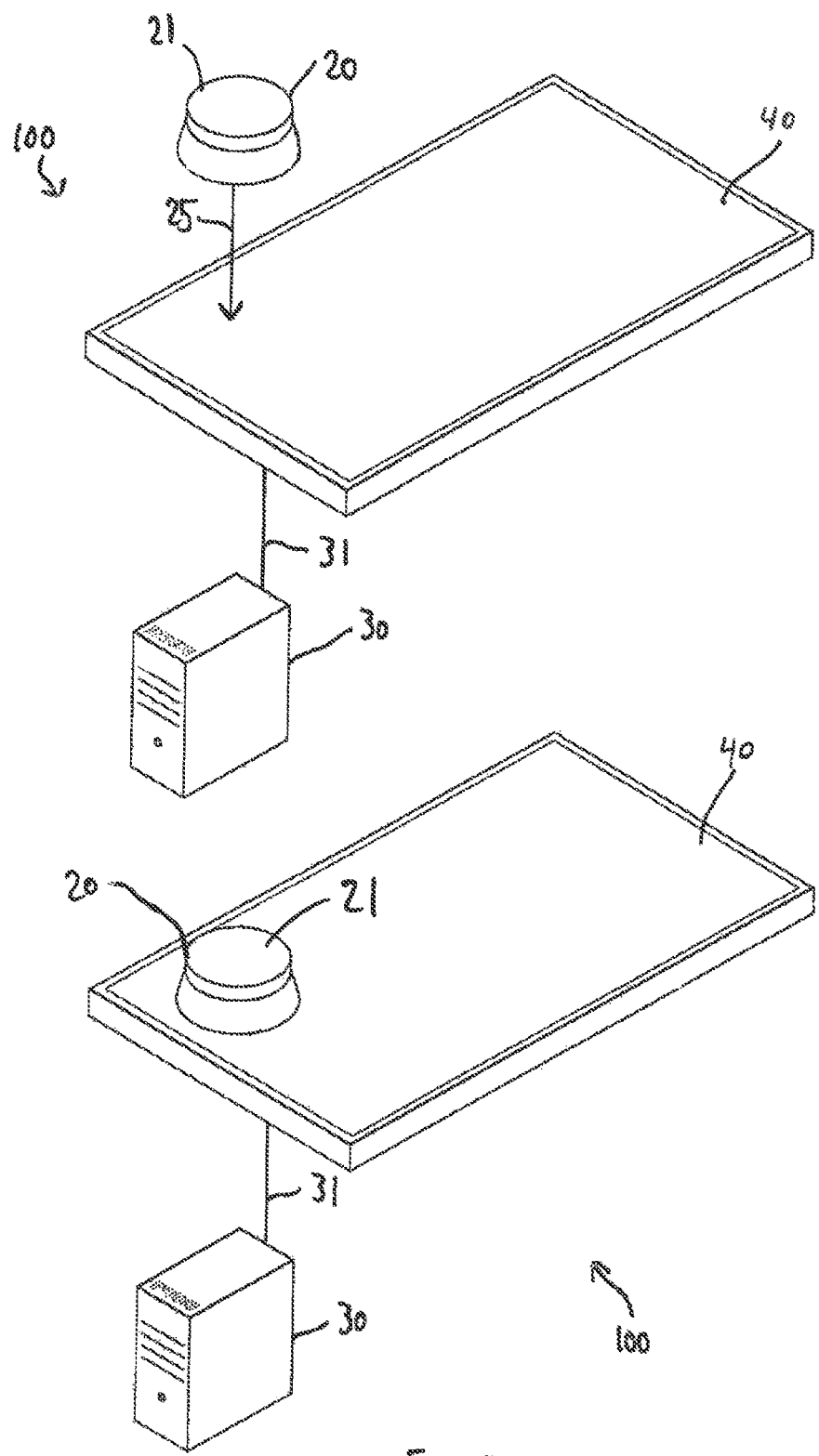
Figure 6:
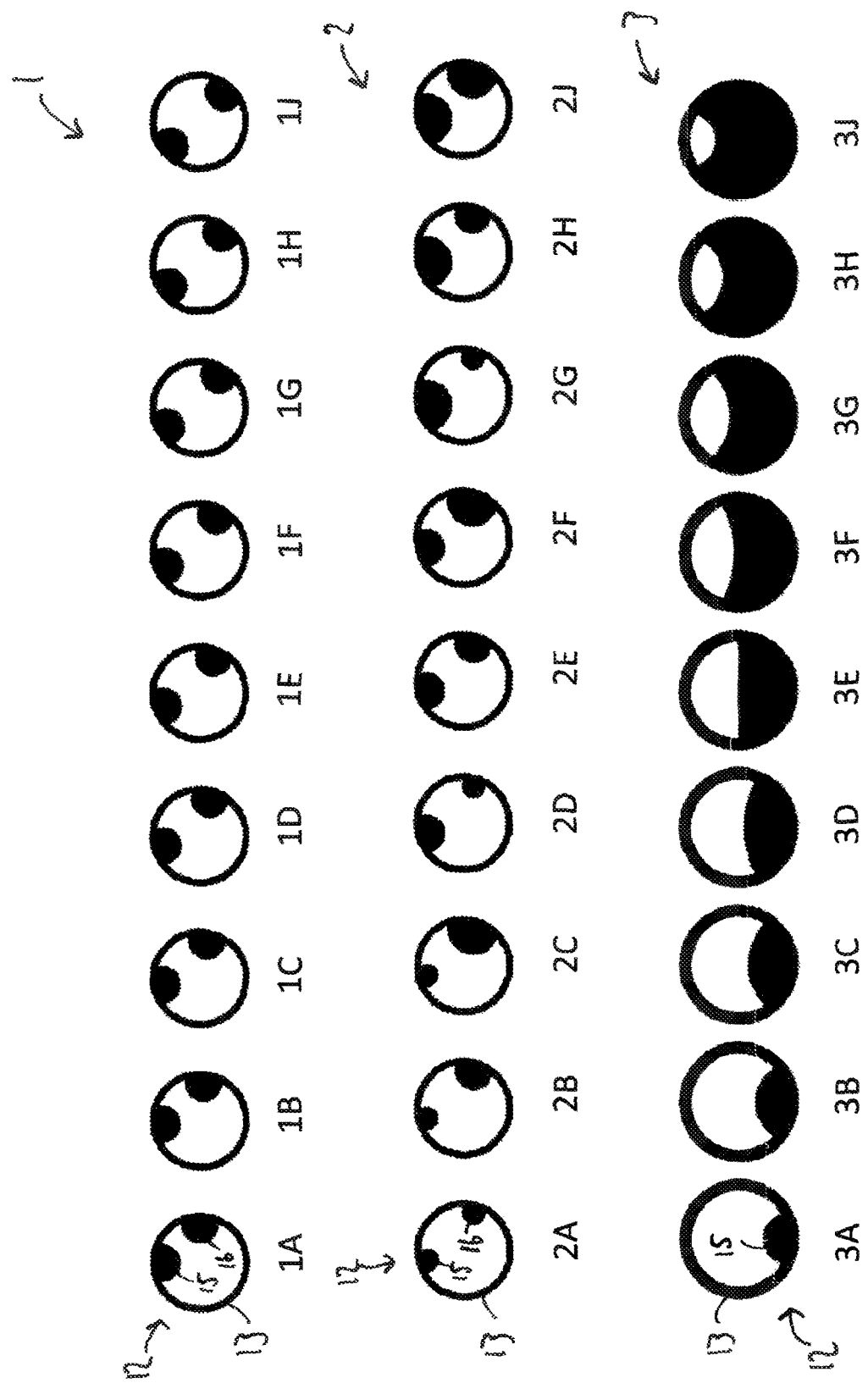
Figure 9:
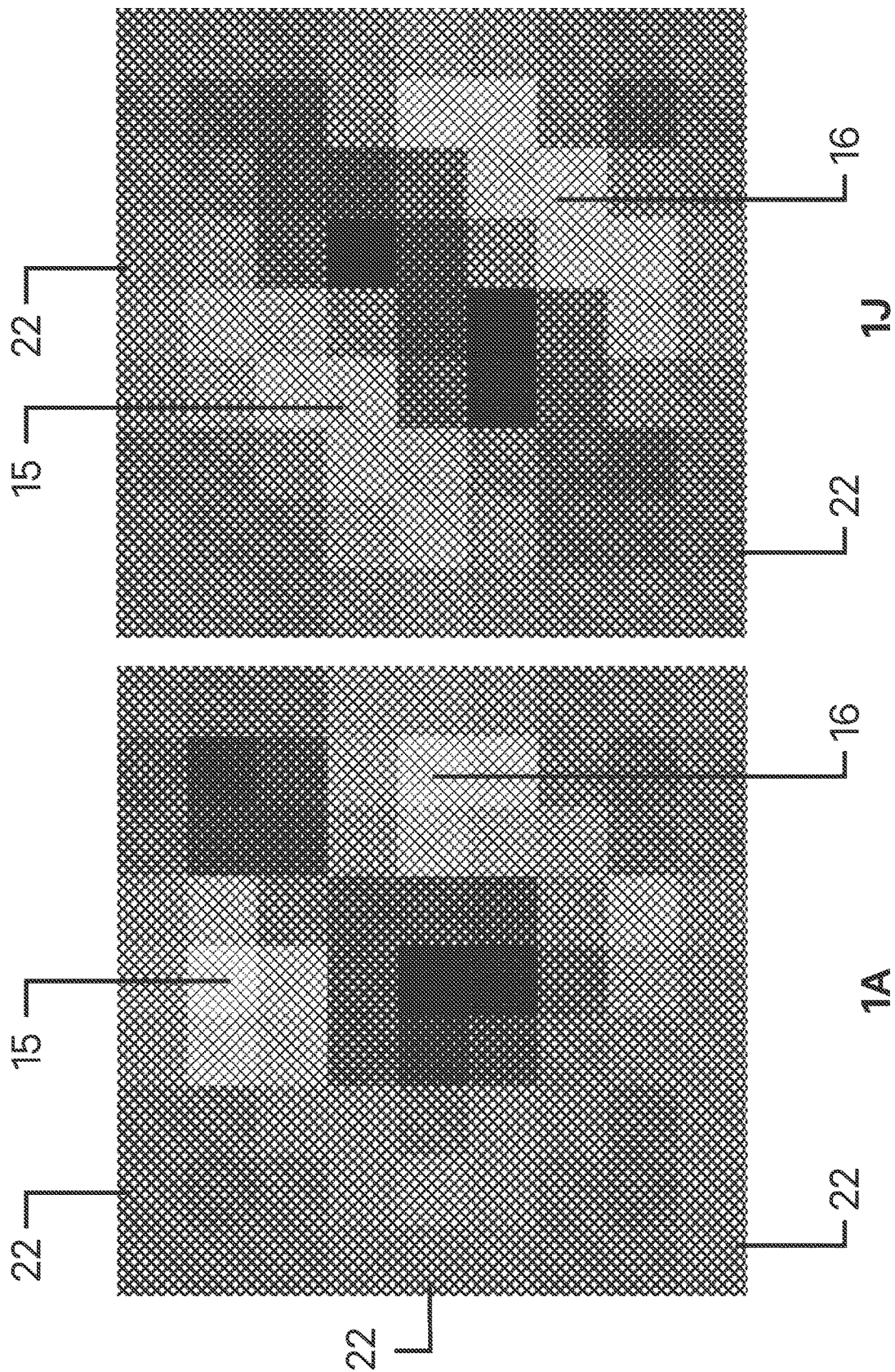
Figure 19:
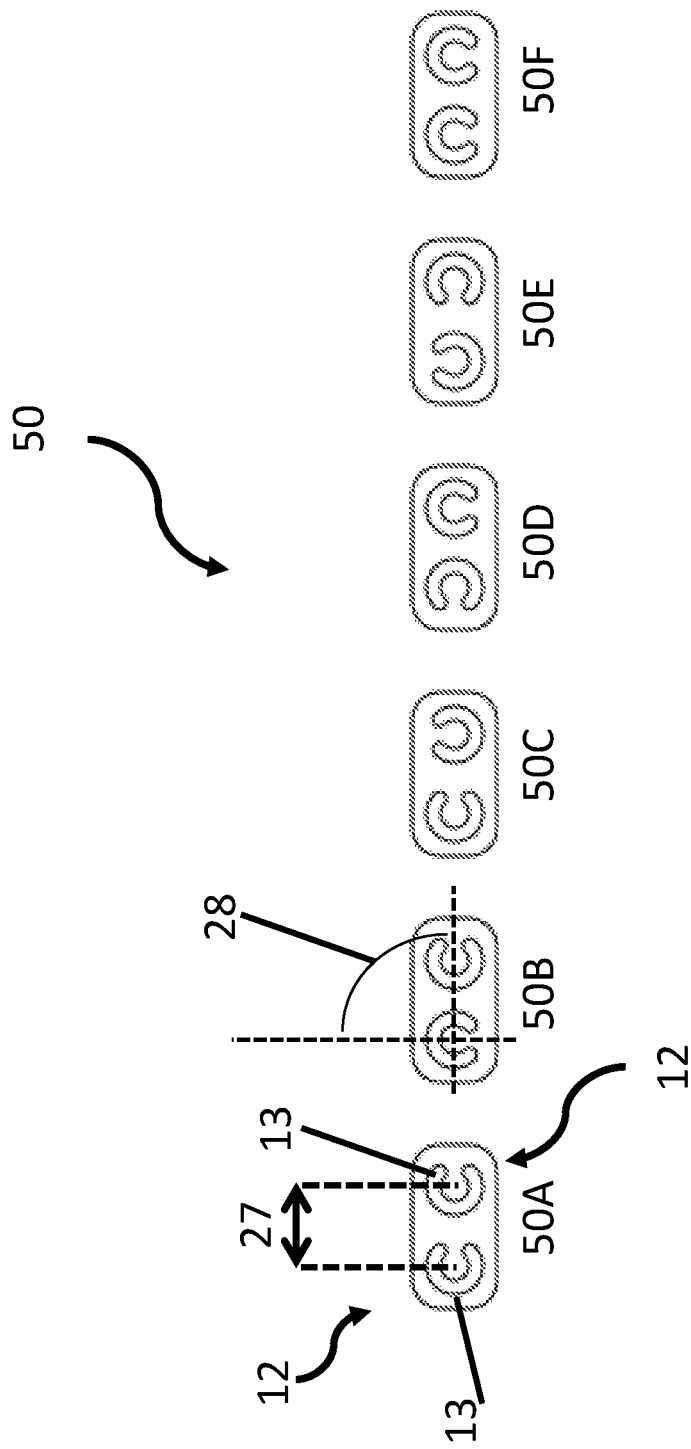

The invention is explained with reference to the accompanying figures. Shown are:
  FIG. 1 a bottom view of an arrangement;
  FIG. 2 a bottom view of another arrangement;
  FIG. 3 a section of the arrangement of FIG. 2;
  FIG. 4 a section of an input element with the arrangement of FIGS. 2 and 3;
  FIG. 5 a perspective view of a system comprising an input element, a touch-sensitive screen, and a control and processing unit;
  FIG. 6 various embodiments of an electrically conductive structure
  FIG. 7 further embodiments of an electrically conductive structure;
  FIG. 8 bottom views of two arrangements;
  FIG. 9 capacitance patterns of the arrangements of FIG. 8 captured by a touch-sensitive screen; and
  FIGS. 10-16 capacitance patterns of an arrangement recorded by a touch-sensitive screen at different orientations of the arrangement on the screen;
  FIGS. 17-19 further various embodiments of electrically conductive structures.

In the figures, recurring or similar features are provided with the same reference signs.

FIG. 1 shows a bottom view of an arrangement 10, which is designed for detection by touch-sensitive sensors. The arrangement 10 includes an electrically conductive structure 12 and an electrically insulating substrate material 14 on which the structure 12 is deposited or in which the structure 12 is embedded. The electrically insulating substrate material 14 supports the structure 12 and serves as a mechanical support for the structure 12. In addition, substrate material 14 provides electrical insulation for electrically conductive structure 12. In particular, the arrangement 10 may be detected by capacitive sensors when the arrangement 10 contacts (touches) these sensors. Here, the capacitive sensors are preferably part of a touch-sensitive screen 40 (see below).

The electrically insulating substrate material 14 may be configured, for example, as a plastic film, the plastic film preferably being made essentially of a soft, elastic material. In particular, the electrically insulating substrate material 14 may have or be a polymeric material. The polymeric material may include an optically transparent material such as polyacrylate, acrylic (polymethylmetacrylate, PMMA), polycarbonate (PC), polyvinyl chloride (PVC), polystyrene (PS), polyphenylene ether (PPO), polyethylene (PE), or polyethylene terephthalate (PET), or combinations thereof. As such, the substrate material 14 may have an optical transmittance of at least 75% in the visible wavelength range 400 nm-700 nm. The substrate material 14 may also comprise or be formed from paper, cardboard or textile.

In the embodiment shown, the arrangement 10 is formed as a cover of an electronic input device, the electronic input device being, for example, a cell phone such as a smartphone. The cover 10 may be positively or non-positively attached to the electronic input device. In the assembled state, the cover 10 forms the bottom side of the input device. The cover 10 includes a cutout 18 to prevent a camera of the smartphone from being obstructed by the cover 10. If the substrate material 14 and/or the structure 12 comprise a transparent material, the cutout 18 may be omitted.

The electrically conductive structure 12 has an annular touch surface 13 (contact surface) and a marker 15, 16, 17. Here, the marker 15, 16, 17 is designed to break the rotational symmetry of the annular touch surface 13.

In the embodiment of FIG. 1, the marker is provided in the form of two touch surfaces 15, 16 (touch surfaces 15, 16). The two touch surfaces 15, 16 are arranged within the annular touch surface 13 and are electrically conductively connected to the annular touch surface 13. The conductive structure 12 thus forms an arrangement of at least partially interconnected conductive components 13, 15, 16. The structure 12 is detectable by means of touch-sensitive capacitive sensors of a touchscreen 40, as will be further discussed in connection with FIG. 5.

The touch surfaces 13, 15, 16 of the arrangement 10 form a touch pattern on the bottom side of the arrangement 10, wherein the touch pattern in the embodiments of the input element 10 has no symmetry or at most a $C_S$ symmetry, i.e. the two-dimensional touch pattern has no rotational symmetry. A ratio of conductive area to non-conductive area within the annular touch surfaces 13 is less than 0.8, in particular less than 0.6, preferably less than 0.3. An outer diameter of the annular touch surface 13 is preferably greater than the spacing of adjacent conductor paths in the touch-sensitive screen 40. The outer diameter of the annular touch surface 13 is preferably at least 10 mm. In the embodiment shown, the outer diameter is about 42 mm.

In the embodiment example of FIG. 1, the touch surfaces 15, 16 have both an identical shape and an identical size. In other embodiments, which will be discussed below, two differently sized and/or two differently shaped touch surfaces may also be provided.

FIG. 2 shows a bottom view of another arrangement 11, which has the same electrically conductive structure 12 as that of the arrangement 10 of FIG. 1. In contrast to FIG. 1, the insulating substrate material 14 is circular here. The arrangement 11 can be used as an independent input element. Alternatively, the arrangement 11 may be connected to an input element 20. An arrangement 11 for connecting to an input element 20 is shown in FIGS. 3 and 4.

FIGS. 3 and 4 each show a sectional view of the arrangement 11 and a sectional view of the arrangement 11 connected to an input element 20. For this purpose, the arrangement 11 has an optional fastening means 19 for fastening the arrangement 11 to a housing 21 of the input element 20. For example, the arrangement 11 is fixedly or releasably connected to the input element 20 by means of the fastening means 19. Depending on the application, the fastening means may be hooks, eyelets, adhesive, Velcro, suction cup, etc. In the illustrated FIG. 3, the fastening means 19 is designed as an optically transparent adhesive layer 19. The fastening means is arranged, for example, on a side of the arrangement 11 opposite the electrically conductive structure 12, but may also be arranged on the same side as the electrically conductive structure 12. The arrangement 11 is attached to a bottom side of the housing 21. The input element 20 is configured as an input element 20 for a touch-sensitive screen 40. The input element 20 includes a housing 21 made substantially of a non-conductive plastic, such as PU, or rubber. A suitable material would be, for example, Obomudolan®.

Figure 7:
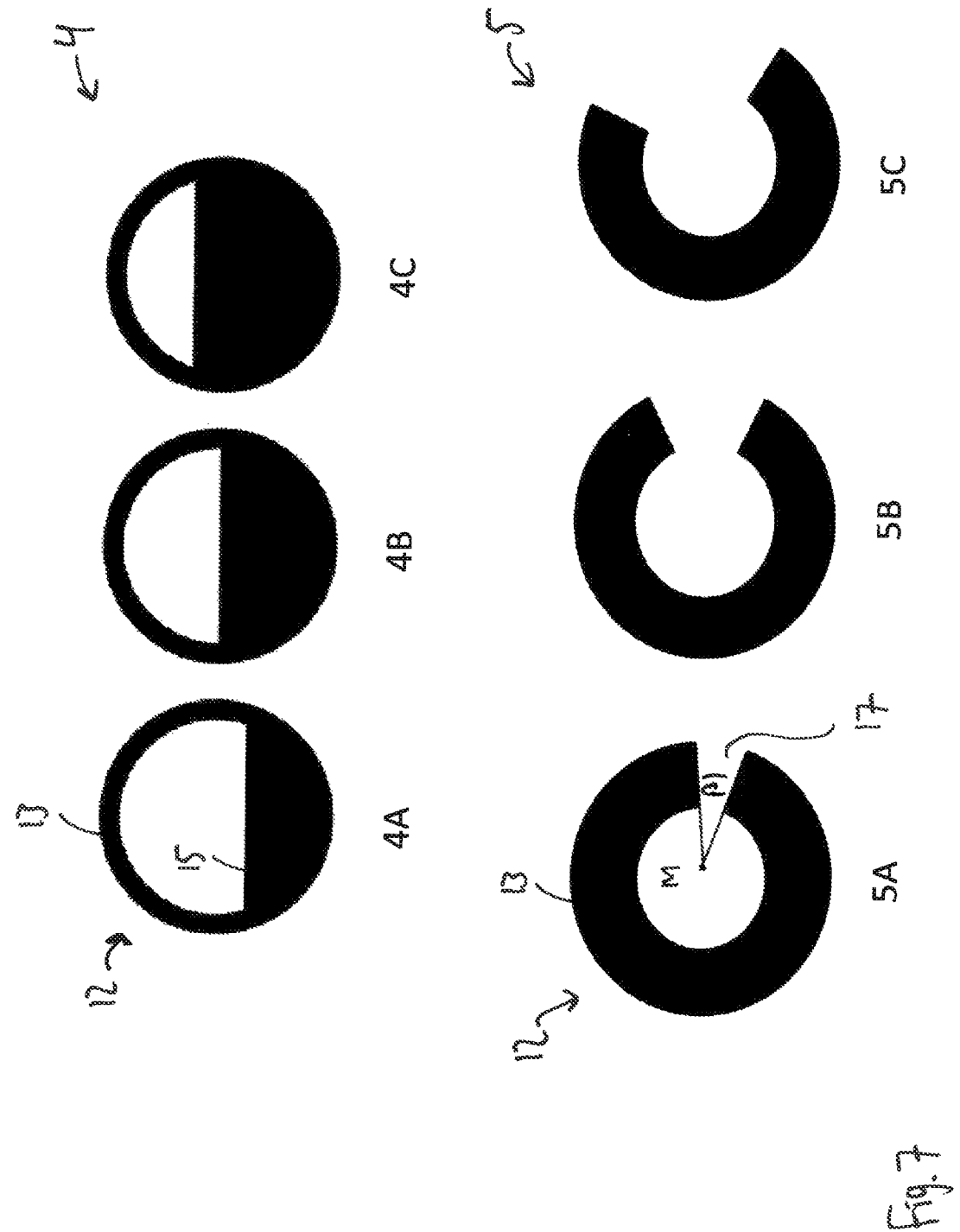

FIGS. 6, 7 and 8 show examples of various electrically conductive structures 1A-1J, 2A-2J, 3A-3J, 4A-4C, 5A-5C, which can be used, for example, in the arrangements 10 and 11 of FIGS. 1 to 4. In the following, we will refer to structure 12 for the sake of simplicity. It is clear here that the other structures 1A-1J, 2A-2J, 3A-3J, 4A-4C, 5A-5C may also be meant. In addition, for the sake of clarity, not every structure shown in the figures has been given reference signs.

The electrically conductive structure 12 is configured to be detected by a touch-sensitive screen 40. In particular, the electrically conductive structure 12 is configured to cause capacitance changes when the structure 12 is placed on the touch-sensitive screen 40 that are detectable by capacitive sensors of the touch-sensitive screen 40.

FIG. 5 shows two perspective views of a system 100, the system comprising the input element 20 described in FIG. 4 and further comprising a touch-sensitive screen 40 and a control and processing unit 30. Instead of the input element 20, also only the arrangement 10, 11 may be provided. The arrangement 10, 11 may also be provided in addition to the input element 20. Reference is made below to the input element 20.

The input element 20 is placed on or put down on the touch-sensitive screen 40, as indicated by an arrow 25.

The touch-sensitive screen 40 is connected to the control and processing unit 30 by means of a cable 31, the cable preferably being a USB cable.

Alternatively, a wireless connection may be provided between the display screen 40 and the control and processing unit 30. The touch-sensitive screen 40 is also referred to as a touchscreen, and in the embodiment shown is a capacitive touch-sensitive screen. The touch-sensitive screen 40 may also function as a tabletop, for example, in which case one or more table legs may be mounted to the touch-sensitive screen 40.

Furthermore, the touch-sensitive screen 40 is designed to detect a plurality of touches simultaneously (multi-touch display). Here, the touch can be made by a human finger as well as by the touch surfaces 13, 15, 16 of the input element 20 shown above. Further, touch surfaces 13, 15, 16 of a plurality of input elements 20 may be simultaneously detected by the touch-sensitive screen 40.

The touch-sensitive screen 40 includes a sensor matrix having a plurality of rows and columns. Each column and each row includes a vertical wire (conductor path) and a horizontal wire (conductor path), respectively, and a capacitive sensor is placed at the crossing points of each wire.

The electrically conductive material of the structure 12 typically extends across multiple wires of the sensor matrix and generally causes capacitive coupling to other wires, particularly horizontal wires, that are grounded. The structure 12 may cause a signal change similar to a user's finger. However, with a lower signal-to-noise ratio, typically from 1:3 to 1:20, since the sensor glass must be overcome twice.

For example, the touch-sensitive screen 40 may have a screen diagonal of between 5 and 100 inches. In the embodiment of FIG. 5, the touch-sensitive screen 40 has a screen diagonal of 55 inches, with dimensions of 1220 mm×680 mm, and has 172×105 pixels.

The control and processing unit 30 is further configured to receive and evaluate signals (touch signals) triggered by the touch surfaces 13, 15, 16 of the input element 20 in the touch-sensitive screen 40.

Placement of the input element 20 on the touch-sensitive screen 40 is detected by capacitive sensors of the touch-sensitive screen 40 due to the conductive structure 12 of the arrangement 10, 11. Corresponding sensor data generated by means of capacitive sensors of the touch-sensitive screen are passed on as an analog signal to a touch controller, which may be structurally integrated into a panel of the touch-sensitive screen 40 designed as a table, where they are digitized and interpolated at a time interval of 0.1 ms and then passed on together with a time stamp via USB 2.0 or 3.0 to the control and processing unit 30, where the sensor data are received, stored and further processed. In this regard, the touch controller may also be part of the control and processing unit 30, and the control and processing unit 30 or parts thereof may also be integrated into the panel of the touch-sensitive screen 40 or into a housing of the touch-sensitive screen 40.

After the input element 20 or the arrangement 10, 11 is placed on the touch-sensitive screen 40, the control and processing unit 30 creates and stores a capacitance pattern for the conductive structure 12 of the input element from the sensor data, the capacitance pattern including a spatially resolved representation of at least two differently sized capacitance changes or at least three pairwise differently sized capacitance values or values derived therefrom.

In the process, the control and processing unit 30 determines the position and orientation of the input element 20 on the touch-sensitive screen 40 from the sensor data.

The control and processing unit 30 is configured to control the touch-sensitive screen 40 based on the sensor data. That is, for example, when the input element 20 is moved along the arrow 25 shown in the figure, this is registered by the control and processing unit and actions can be performed in response. For example, a display of the touch-sensitive screen 40 may be changed depending on this sensor data. The control and processing unit 30 can, for example, color-code an area of the touch-sensitive screen 40 that represents an environment of a placed input element 20 or display writing there.

Based on the sensor data, other actions can also be initiated. For example, when a user changes the orientation or position of the input element 20 on the screen 40, this is registered and an action may subsequently be performed.

In summary, input possibilities for the control and processing unit include input on the touch-sensitive screen itself, for example by a finger, and additionally input by movements of the input element 20 or the input elements. On the other hand, there are the possible actions that the control and processing unit 30 can perform. This includes, for example, modifying the display of the touch-sensitive screen 40. Multiple actions are also possible with multiple input elements 20 applied.

FIG. 9 shows two capacitance patterns in which sensor signals from the capacitive sensors of a touch-sensitive screen 40 are displayed in a spatially resolved manner, showing the sensor signals triggered by the arrangements 1A and 1J in the sensor matrix of the touch-sensitive screen 40. The touch-sensitive screen 40 includes a capacitive grid of electrical detection conductor paths arranged orthogonally to each other. In this case, the horizontal detection conductor paths are in a first plane and the vertical detection conductor paths lines are in a second plane spaced therefrom so that capacitance can be measured at the intersection points between the horizontal and vertical lines (which represent a projection of the detection conductor path planes onto each other). When a finger or conductive structure 12 of a put down arrangement 10, 11 is brought near the grid, the capacitance changes at crossing points located in the area where the contacting or approaching occurs. Thus, the crossing points represent the pixels at which spatially resolved capacitance changes can be detected. Where the arrangement 10, 11 has been put down, a change in capacitance is registered at some crossing points, which is indicated in the images by a hatching of a square area around the respective crossing point if it exceeds a certain threshold. Thus, a location where the arrangement 10, 11 was placed on the screen 40 can be detected.

In FIG. 9, capacitance patterns of the arrangements 1A and 1J of FIG. 8 recorded through the touch-sensitive screen 40 are shown. For clarity, two square sections of the touch-sensitive screen 40 are shown. The length and width of the square sections correspond to the diameter of the annular touch surfaces 13 of the arrangements 1A and 1J plus one row and one column. The structure of the annular touch surface 13 is already clearly visible in these images. In FIG. 9, the hatchings at the outermost edge 22 correspond to the values measured without interference on the screen 40 between the wires of the sensor matrix. The outer border has a width and length of one pixel each. Thinner hatches are caused by conductive material, i.e. structure 12, at locations where retransmission is low. As indicated above, the signals triggered by retransmission are negative and are indicated in FIG. 9 by hatchings which are thicker than the hatchings at the edge 22. Thicker hatches are thus caused at locations without conductive material and with retransmission. Furthermore, in FIG. 9 the position of the touch surfaces 15, 16 is indicated by reference signs. In particular, it can be seen that the touch surfaces 15, 16 of the arrangement 1A, 1J trigger positive signals, i.e., hatchings with thinner thicknesses than the hatchings at the edge 22, in the sensors of the touch-sensitive screen 40. It is also readily apparent that the touch surfaces 15, 16 of the arrangement 1A are arranged at a central angle $\alpha$ of approximately 90° to each other. As a result, the characteristic negative signals triggered by retransmission are greatest between these touch surfaces 15, 16 (top right) and in the center of the annular touch surface 13. The touch surfaces 15, 16 of the arrangement 1J are arranged approximately opposite each other and form a center angle α of about 170. As a result, the negative signals triggered by retransmission are greatest around the center of the annular touch surface 13. Arrangements 1A and 1J thus exploit the effect of retransmission for an assignment of arrangements 1A, 1J.

FIGS. 10-16 show capacitance patterns 200, 215, 230, 245, 260, 275, 290 of a single arrangement 23 captured by the touch-sensitive screen 40 at different orientations of the arrangement 23 on the screen 40. Here, the arrangement 23 has a distance of 4 pixels to the edge of the cutout. The edge thus measures no signal, i.e. a capacitance change of 0 F. The arrangement 23 is resolved by about 64 crossing points of the screen (square with a length of 8 pixels and a width of 8 pixels). The structure and orientation of the arrangement 23, in particular the electrically conductive structure 12 of the arrangement 23, is shown here in reduced form on the right. Similar to FIG. 9, the hatching of the capacitance pattern is thicker for negative signals (corresponding to retransmission). The hatching of the capacitance pattern is thinner for positive signals. Positive signals are measured in particular near the touch surfaces 13, 15, 16. Negative signals are measured in particular in the center of the ring-shaped structure 13 and in the corner points of the square outside the ring-shaped structure 13. In FIGS. 10-16, the relative orientation of the arrangement 23 on the screen 40 is 0°, 15°, 30°, 45°, 60°, 75°, and 90°, respectively. It can be seen that the capacitance patterns 200, 215, 230, 245, 260, 275, 290 are sufficiently different from each other to provide an indication of the orientation of the arrangement 23 on the screen 40. Due to the selected marker of the arrangement 23 in the form of two touch surfaces 15, 16, the rotational symmetry of the annular touch surface 13 is broken and therefore a determination of the orientation of the arrangement 23 on the touch-sensitive screen 40 is possible. In other words, each orientation of the arrangement 23 evokes a characteristic capacitance pattern 200, 215, 230, 245, 260, 275, 290 with positive and negative signals in the screen 40 that is distinguishable from the other capacitance patterns.

It should be noted that detection may also occur when the input element 20 and/or the arrangement 10, 11 are not touched by a user. Since all but one of the horizontal and one of the vertical detection conductor path of said grid are grounded, for example, adjacent detection conductor paths can be derived even if a region of the conductive structure 12 is on a detection conductor path that is grounded. Because conductive structures 12 in typical arrangements 10, 11 extend over an area of the arrangement 10, 11 that includes a plurality of conductive traces on the touch-sensitive screen 40, reliable detection by the touch-sensitive screen 40 no longer requires that the input element 20 or the arrangements 10, 11 be touched by a user.

In addition to a location of such a capacitance change, its magnitude may also be detectable to enable the creation of a capacitance pattern for the conductive structure 12 of the arrangement 10, 11 that includes a spatially resolved representation of at least two different magnitude capacitance changes or at least three pairwise different magnitude capacitance values or magnitudes derived therefrom. Such capacitance patterns are shown for arrangements 1A and 1J in FIG. 9.

This is achieved, for example, by using different threshold values to detect the capacitance changes, so that a signal is triggered, for example, at 10%, 20%, 30%, ... 100% of a maximum value, or corresponding negative signals (thick hatchings in FIG. 9) due to retransmission. At least two such thresholds can be used.

For example, images can be captured at a threshold of 1 pF and 2.5 pF. This corresponds to 10% or 25% of a typical capacitance change of 10 pF caused by a finger, which is used here as the maximum value.

This means that only a very small change in capacitance is required for a first signal that is triggered at just 10% of the maximum value. This is caused at many points where the arrangement 1A, 1J contacts (touches) the screen 40 (see FIG. 9). Accordingly, the image in FIG. 9 shows the outline of the entire arrangements 1A and 1J. It can thus be used to determine the position of the arrangement 1A, 1J on the screen 40, but does not provide any information about the internal details of the structure 12. For example, it is not apparent where top and bottom are and what the orientation of the arrangement 1A, 1J is on the screen 40.

The second signal, on the other hand, is only triggered when capacitance changes of at least 2.5 pF are present. This provides a more nuanced picture. The conductive structure 12 triggers a signal at this threshold in that the markers 15, 16 are clearly visible. Due to the marker 15, 16 a symmetry is broken and in addition to the position also the orientation of the arrangement 1A, 1J can be analyzed. It can be determined, for example, by comparison with data from the memory of the control and processing unit 30, that the top and bottom are different in the present arrangement, and that the same image does not result after a rotation of 180°. The relative position of the signal strengths on the circumference of the annular touch surface 13 and inside the annular touch surface 13 to each other is crucial for symmetry breaking. In addition to symmetry breaking, the differences in internal structure, i.e., markers 15, 16, also allow the different arrangements 1A, 1J to be distinguished.

The control and processing unit 30 may compare the capacitance pattern with previously known capacitance patterns, as mentioned, to identify, for example, an input element 20, an arrangement 1A, 1J, or construction type.

Recognition may be trained using machine learning methods, for example. It should be noted that identification typically cannot be based solely on absolute values of capacitance changes, since the absolute value depends on whether the arrangement 1A, 1J or the input element 20 are touched, where they are located on the screen, and how they are oriented.

Once the capacitance pattern is detected, the control and processing unit 30 can track its movements, for example, rotations and/or translations on the screen 40 based on the sensor data.

When using multiple input elements 20 and/or multiple arrangements 10, 11, it may be advantageous to also form groups of arrangements 10, 11. Each arrangement 10, 11 of the group has a differently configured electrically conductive structure 12. For example, structures 1A, 1B, 1C, 1D, 1E, 1F, 1G, 1H, LI are shown in FIG. 6, which are there designated as group 1. The structures 1A-1J of the group 1 differ in the arrangement of the first touch surface 15 and the second touch surface 16 relative to each other. The touch surfaces 15, 16 are the same size and shape, but are located at different locations within the annular touch surface 13. In particular, the electrically conductive structures 15, 16 of the arrangements 1A, 1B, 1C, 1D, 1E, 1F, 1G, 1H, 1J are spaced apart from each other such that a circumferential distance between the first touch surface 15 and the second touch surface 16 on the annular touch surface 13 is at least as large as the distance between adjacent sensor wires in the sensor matrix.

The electrically conductive structures 1A and 1J of FIG. 6 are shown enlarged again in FIG. 8 for comparison. Here, in the structure 1A, a first imaginary straight line 6 passes through the center M of the annular touch surface 13 and the center of gravity of the first touch surface 15. In addition, a second imaginary straight line 7 passes through the center M of the annular touch surface 13 and the center of gravity of the second touch surface 16. The first straight line 6 and the second straight line 7 form an angle α of less than 180° and greater than 0°, where the angle α in the structure 1A is about 90°. The angle α can be understood as a center angle. For the structures 1A, 1B, 1C, 1D, 1E, 1F, 1G, 1H, 1J shown in FIG. 6, the angle α is: 90°, 100°, 110°, 120°, 130°, 140°, 150°, 160° and 170° respectively. In total, Group 1 thus comprises nine different electrically conductive structures. For example, with a diameter of the annular touch surface of 42 mm and a circumferential distance of 7 mm between the first touch surface 15 and the second touch surface 16, the center angle α is about 20° or a multiple of 20° (e.g., 40°, 60°, 80°, 100°, 120°, 140°, or 160°).

Further shown in FIG. 6 are structures 2A, 2B, 2C, 2D, 2E, 2F, 2G, 2H, 2J, which are there designated as group 2. Structures 2A-2J of group 2 differ with respect to the size of the touch surfaces 15, 16. Here, there are three differently sized first touch surfaces 15 and three differently sized touch surfaces 16 in the group 2. By combining the different sizes, there are a total of nine different structures 2A, 2B, 2C, 2D, 2E, 2F, 2G, 2H, 2J. Otherwise, the centers of gravity of the touch surfaces 15, 16 are at the same locations within the annular touch surface 13; in other words, the angle α is the same for all structures 2A-2J.

Also shown in FIG. 6 are nine different structures 3A, 3B, 3C, 3D, 3E, 3F, 3G, 3H, 3J that form a group 3. Group 3 structures differ in size and shape. The structures of group 3 have a single touch surface 15 within the annular touch surface 13.

Pairs 3A-3J, 3B-3H, 3C-3G, 3D-3F of structures may be formed, the touch surfaces 15 of these pairs being complementary in shape and together forming a circle which completely fills the annular touch surface 13. The outlines of the touch surfaces 15 of the structures 3A, 3B, 3C, 3D, 3F, 3G, 3H, 3J are each bounded by two circular arcs, one of the circular arcs being defined by an inner circular arc of the annular touch surface 13. The perimeter of the touch surface 15 of the structure 3E is delimited by a line and an arc.

The touch surface 15 of structure 3E forms a semicircle and may form a circle with another structure 3E, which completely fills the annular touch surface 13.

Also shown in FIG. 7 are three different structures 4A, 4B, 4C, forming a group 4. Group 4 structures differ in size and shape. The structures of group 4 have a single touch surface 15 within the annular touch surface 13. In a similar manner to group 3, in group 4 structures 4A and 4C are complementary in shape and together form a circle which completely fills the annular touch surface 13. The touch surface 15 of structure 4B forms a semicircle and may form a circle with another structure 4B, which completely fills the annular touch surface 13. The outlines of the touch surfaces 15 of the structures 4A, 4B, 4C are defined by a line and an arc.

For all groups 1, 2, 3, 4, each electrical structure 12 of each group has an identical annular touch surface 13. However, the structures within each group 1, 2, 3, 4 differ in terms of their markers 15, 16. At most, each electrically conductive structure 12 has a mirror symmetry plane, but no rotational symmetry.

Further shown in FIG. 7 is a group 5 with three different structures 5A, 5B, 5C. The structures of group 5 differ from the structures of groups 1, 2, 3, 4 in such a way that the marker 17 of structures 5 is an opening 17 of the annular touch surface. For example, the opening 17 has an opening angle β of at least 10° and/or at most 45°.

In FIG. 17, a group 8 is shown with six different structures 8A-8F, which are C-shaped or horseshoe-shaped. The structures 8A-8F of group 8 differ from the structures of groups 1-5 in such a way that an annular width 24 of the annular structure 13 and a diameter 26 of the annular structure 13 are used as markers. Different diameters 26 and annular widths 24 can thus be used to create further variations. In addition, structures 8A-8F may have openings 17 with different opening angles in a manner analogous to structures 5A-5C. Thus, the openings of structures 8A and 8F also have different opening angles or different sized openings. The annular widths 24 and diameter 26, or variations of the ring widths 24 and diameter 26, are selected to be resolvable by the touch-sensitive screen 40. In the embodiment shown, the diameters vary from 40 mm to 45 mm. Annular widths vary from 2 mm to 8 mm.

FIG. 18 shows a group 9 with six different structures 9A-9F. The electrically conductive structures 9A-9F differ from structures 8A-8F only in that a bump is additionally provided as a marker 15 in analogy to groups 1-4. Pairs 8A, 9A; 8B, 9B; 8C, 9C; 8D, 9D; 8E, 9E; and 8F, 9F may be formed, the structures of the respective pairs being distinguishable by the presence or absence of the marker 15. The bump 15 may have a fixed diameter of, for example, 12 mm. Although the marker 15 in the group 9 are each arranged centrally opposite the opening 17, other positions of the marker 15 within the C-shape are also conceivable and can be combined with one another.

FIG. 19 shows a group 50 of arrangements 50A-50F, which differ with respect to the orientation of the electrically conductive structures. Each arrangement 50A-50F has two electrically conductive structures 12, each of which includes an annular touch surface 13 having an opening (cf. opening 17 of FIG. 7) and is therefore C-shaped or horseshoe-shaped. The electrically conductive structures 12 of each arrangement 50A-50F have a predetermined distance 27 from each other, which is determined by the length of the connecting distance of the centers of the annular touch surfaces 13.

Each touch surface 13 also has a predetermined diameter and a predetermined annular width (thickness). The arrangements 50A-50F differ only by an angle of rotation 28 of the electrically conductive structures 12 and the openings 17, respectively, relative to each other, the angle of rotation 28 thus being configured as a marker. The C-shaped touch surfaces 13 thus have different orientations to each other. Preferably, the C-shaped touch surfaces 13 are configured in such a way that an angle of rotation 28 of 22.5 can still be distinguished. It is also possible to vary the distance 27 of the structures (not shown).

The use of identically shaped electrically conductive structures has the advantage that the detection only has to recognize one structure and its angle of rotation 28. For example, to train a machine learning algorithm, one can collect data for only one C (many different positions relative to the sensor matrix) and then derive the six combinations shown. This reduces the effort for data acquisition, training and recognition. Especially when several hundred combinations are used due to smaller angles of rotation 28.

In the example shown in FIG. 19, the same C-structure is used twice, and by rotating it through 90° to each other, distinguishable combinations are created. The total number of combinations that can be distinguished on the touch-sensitive screen is as follows:

90° means 4 angles, i.e. 4^2 combinations in which each structure and its 180° rotated counterpart occur twice, and 4 which merge at 180° rotation (all those whose 2nd C is rotated by exactly 180), and therefore cannot be used. This yields (4^2−4)/2=6 distinguishable combinations.

45° means 8 angles, i.e. (8^2−8)/2=28

22.5° means 16 angles, i.e. (16^2−16)/2=120

12.5° means 32 angles, i.e. (32^2−32)/2=496

Although the electrically conductive structures 12 of FIG. 19 are the same (i.e., same shape and size), a large number of distinguishable patterns are still possible via variation of the angle of rotation 28.

The position of the combined structures can be the center of the connecting section. The angle of rotation 28 can be determined from the direction of the connection vector. Combinations of more than 2 C-shaped touch surfaces 13 are also conceivable. In further embodiments, the diameter 26, annular width 26, and/or spacing 27 may be varied and combined in addition to angle of rotation 28.

At least for groups 1, 2, 5, 8, 9, and 50, an area enclosed by the annular touch surface 13 may have a diameter of at least 7 mm, preferably at least 10 mm, the diameter being substantially defined by the sensor wire spacing in the sensor matrix of the screen 40. In some embodiments, the diameter may range from 30 mm to 50 mm, for example. This surface is circular, except for any markers in the form of touch surfaces 15, 16 within the annular touch surface 13.

A method of using the touch-sensitive sensor matrix 40 as defined in this application, or a system 100 as described above, includes at least the following steps:

detecting capacitance changes by capacitive sensors of a touch-sensitive sensor matrix 40, wherein the capacitance changes are caused by an electrically conductive structure 12 of an arrangement 10 contacting the sensor matrix, creating a capacitance pattern for the conductive structure 12 of the arrangement 10, comparing the recorded capacitance pattern with previously known capacitance patterns.

recognizing the arrangement 10 on the touch-sensitive sensor matrix 40.

Further steps of the method include, for example:

detecting, based on the annular touch surface 13 of the arrangement, a position of the arrangement 10 on the sensor matrix or touch-sensitive screen 40, and/or detecting, based on the marker 15, 16 of the arrangement 10, an orientation of the arrangement 10 on the sensor matrix or touch-sensitive screen 40.

Further steps result from the above description.

The arrangement 10, 11 described above can be produced, for example, by means of the following process.

The method of making the arrangement 10, 11 comprises the steps of:

providing an electrically insulating substrate material 14, applying an electrically conductive material to the substrate material 14 or into the substrate material 14, forming the electrically conductive structure 12, forming the arrangement 10, 11.

In an advantageous embodiment, the electrically conductive material is an electrically conductive paint or varnish. In this case, the electrically conductive material can be applied to the substrate material 14 by means of screen printing, for example. Materials that can be used in a screen printing process are then considered for the substrate material 14. When using an electrically conductive coating agent, such as paint or varnish, it can be applied to the substrate material 14 by rolling, brushing and/or spraying.

Alternatively, the electrically conductive material can be applied to the substrate material as a layer or as a prefabricated layer, covering it partially or completely, for example. The electrically conductive structure 12 can be formed by removing part of the electrically conductive layer, in particular by scraping or laser cutting away. The electrically conductive layer can be formed from an ITO (see above).

LIST OF REFERENCE SIGNS 1 electrically conductive structures
1A-1J electrically conductive structures
2 electrically conductive structures
2A-2J electrically conductive structures
3 electrically conductive structures
3A-3J electrically conductive structures
4 electrically conductive structures
4A-4C electrically conductive structures
5 electrically conductive structures
5A-5C electrically conductive structures
6 first straight line
7 second straight line
8 electrically conductive structures
8A-8F electrically conductive structures
9 electrically conductive structures
9A-9F electrically conductive structures
10 arrangement
11 arrangement
12 electrically conductive structure
13 annular touch surface
14 substrate material
15 touch surface
16 touch surface
17 opening
18 cutout
19 adhesive layer
20 input element
21 housing
22 hatching at the outermost edge
23 arrangement
24 annular width
25 direction of motion
26 diameter
30 control and processing unit
31 connection
40 touch-sensitive screen
50 arrangements
50A-50F arrangements
100 system
200 capacitance pattern of arrangement 23 at 0°
215 capacitance pattern of arrangement 23 at 15°
230 capacitance pattern of arrangement 23 at 30°
245 capacitance pattern of arrangement 23 at 45°
260 capacitance pattern of arrangement 23 at 60°

275 capacitance pattern of arrangement 23 at 75°
290 capacitance pattern of arrangement 23 at 90°
α center angle

The invention claimed is:

1. An arrangement for detection using a touch-sensitive sensor matrix, comprising:
at least one electrically conductive structure, the at least one electrically conductive structure having an annular touch surface and at least one marker;
an electrically insulating substrate material on which the at least one electrically conductive structure is applied or in which the at least one electrically conductive structure is embedded; and
wherein the annular touch surface is configured such that placing the arrangement on the touch-sensitive sensor matrix, will cause a capacitance change detectable as sensor data by one or more capacitive sensors of the touch-sensitive sensor matrix, wherein the annular touch surface is configured to trigger a stronger signal in the touch-sensitive sensor matrix than the at least one marker, wherein the at least one electrically conductive structure is configured to trigger at least one negative signal by retransmission in the touch-sensitive sensor matrix in at least one corner point of a square of the touch-sensitive sensor matrix outside the annular touch surface, to trigger at least one negative signal in a center of the annular touch surface where there is no electrically conductive material, and to trigger at least one positive signal in the touch-sensitive sensor matrix where the annular touch surface overlaps with the touch-sensitive sensor matrix, and wherein the square of the touch-sensitive sensor matrix is defined with a width or length corresponding to a diameter of the annular touch surface and surrounds the annular touch surface when placing the arrangement on the touch-sensitive sensor matrix and wherein the corner points of the square lie outside the annular touch surface such that they do not overlap with the annular touch surface.

2. The arrangement according to claim 1, wherein the at least one marker comprises:
at least one touch surface, wherein the at least one touch surface is electrically conductively connected to the annular touch surface.

3. The arrangement according to claim 2, wherein the at least one touch surface is disposed within the annular touch surface.

4. The arrangement according to claim 2, wherein the at least one marker further comprises at least one of:
at least two differently sized touch surfaces or two differently shaped touch surfaces.

5. The arrangement according to claim 2, further comprising:
a first touch surface; and
a second touch surface, wherein a circumferential distance between the first touch surface and the second touch surface on the annular touch surface is greater than 5 mm.

6. The arrangement according to claim 1, wherein the at least one electrically conductive structure is applied to the electrically insulating substrate material by screen printing.

7. The arrangement according to claim 1, wherein an outer diameter of the annular touch surface is at least 10 mm.

8. The arrangement according to claim 1, wherein the at least one marker is configured to break a rotational symmetry of the annular touch surface.

9. The arrangement according to claim 1, wherein the at least one marker comprises:
an opening of the annular touch surface, wherein the opening includes at least one of an opening angle (β) of at least 30° or at most 150°, or wherein the annular touch surface through the opening is C-shaped or horseshoe-shaped.

10. The arrangement according to claim 1, comprising:
a first electrically conductive structure and a second electrically conductive structure forming a pair of electrically conductive structures, wherein each the first electrically conductive structure and the second electrically conductive structure include an annular touch surface and a marker, and wherein the pair of electrically conductive structures includes at least one additional marker associated with the pair.

11. The arrangement of claim 10, wherein the at least one additional marker associated with the pair of electrically conductive structures comprises at least one of an angle of rotation or a distance of the first electrically conductive structure and the second electrically conductive structure forming the pair of electrically conductive structures relative to each other.

12. The arrangement according to claim 10, wherein the first electrically conductive structure and the second electrically conductive structure forming the pair of electrically conductive structures have at least one of a same size or a same shape.

13. The arrangement according to claim 1, further comprising:
an additional marker comprising at least one of an annular width or a diameter of the annular touch surface.

14. The arrangement according to claim 1, further comprising:
a fastening member configurable to fasten the arrangement to an additional element different from the arrangement.

15. The arrangement according to claim 1, further comprising:
at least one additional arrangement, wherein the at least one additional arrangement has a differently configured electrically conductive structure and a differently configured marker from the arrangement, and wherein the at least one additional arrangement has an identical annular touch surface as the arrangement.

16. A method of manufacturing an arrangement, the arrangement including:
at least one electrically conductive structure including an annular touch surface and at least one marker; and
an electrically insulating substrate material on which the at least one electrically conductive structure is applied to or in which the at least one electrically conductive structure is embedded;
the method comprising:
providing the electrically insulating substrate material;
applying an electrically conductive material to a surface of the electrically insulating substrate material or embedding the electrically conductive material into the electrically insulating substrate material;
forming the at least one electrically conductive structure; and
forming the arrangement; and
wherein the annular touch surface is configured such that, placing the arrangement on a touch-sensitive sensor matrix, will cause one or more capacitance changes detectable as sensor data by one or more capacitive sensors of the touch-sensitive sensor matrix, wherein the annular touch surface is configured to trigger a stronger signal in the touch-sensitive sensor matrix than the at least one marker, wherein the at least one electrically conductive structure is configured to trigger negative signals by retransmission in the touch-sensitive sensor matrix in at least one corner point of a square of the touch-sensitive sensor matrix outside the annular touch surface, to trigger at least one negative signal in a center of the annular touch surface where there is no electrically conductive material, and to trigger at least one positive signal in the touch-sensitive sensor matrix where the annular touch surface overlaps with the touch-sensitive sensor matrix, and wherein the square of the touch-sensitive sensor matrix is defined with a width or length corresponding to a diameter of the annular touch surface and surrounds the annular touch surface when placing the arrangement on the touch-sensitive sensor matrix and wherein the corner points of the square lie outside the annular touch surface such that they do not overlap with the annular touch surface.

17. The method of claim 16, wherein the electrically conductive material is at least one of an electrically conductive paint or an electrically conductive varnish, and wherein the electrically conductive material is applied to the electrically insulating substrate material by screen printing.

18. A system comprising:
an arrangement including at least one electrically conductive structure including an annular touch surface and at least one marker and an electrically insulating substrate material on which the at least one electrically conductive structure is applied to or in which the at least one electrically conductive structure is embedded; and
a control and processing unit, wherein the at least one electrically conductive structure of the arrangement is configured to cause one or more capacitance changes when the arrangement is placed on a touch-sensitive sensor matrix, wherein the one or more capacitance changes are detectable as sensor data by one or more capacitive sensors of the touch-sensitive sensor matrix, and wherein the control and processing unit is configured to receive the sensor data and recognize the arrangement based on the at least one electrically conductive structure; and
wherein the annular touch surface is configured such that, placing the arrangement on the touch-sensitive sensor matrix, will cause the one or more capacitance changes detectable as sensor data by the one or more capacitive sensors of the touch-sensitive sensor matrix, wherein the annular touch surface is configured to trigger a stronger signal in the touch-sensitive sensor matrix than the at least one marker, wherein the at least one electrically conductive structure is configured to trigger at least one negative signal by retransmission in the touch-sensitive sensor matrix in at least one corner point of a square of the touch-sensitive sensor matrix outside the annular touch surface, to trigger at least one negative signal in a center of the annular touch surface where there is no electrically conductive material, and to trigger at least one positive signal in the touch-sensitive sensor matrix where the annular touch surface overlaps with the touch-sensitive sensor matrix, and wherein the square of the touch-sensitive sensor matrix is defined with a width or length corresponding to a diameter of the annular touch surface and surrounds the annular touch surface when placing the arrangement on the touch-sensitive sensor matrix and wherein the corner points of the square lie outside the annular touch surface such that they do not overlap with the annular touch surface.

19. The system of claim 18, wherein the one or more capacitive sensors are configurable to detect a magnitude of two or more capacitance changes at different locations of the at least one electrically conductive structure.

20. A method of detecting an arrangement including at least one electrically conductive structure including an annular touch surface and at least one marker and an electrically insulating substrate material on which the at least one electrically conductive structure is applied to or in which the at least one electrically conductive structure is embedded, of on a touch-sensitive sensor matrix, the method comprising:
detecting one or more capacitance changes by one or more capacitive sensors of a touch-sensitive sensor matrix, wherein the one or more capacitance changes are caused by the at least one electrically conductive structure of the arrangement contacting the touch-sensitive sensor matrix;
creating a capacitance pattern for the at least one electrically conductive structure of the arrangement;
comparing the capacitance pattern with a previously known capacitance pattern; and
recognizing the arrangement on the touch-sensitive sensor matrix based on the comparison; and
wherein the annular touch surface is configured such that, placing the arrangement on the touch-sensitive sensor matrix, will cause the one or more capacitance changes that are detectable as sensor data by one or more capacitive sensors of the touch-sensitive sensor matrix, wherein the annular touch surface is configured to trigger a stronger signal in the touch-sensitive sensor matrix than the at least one marker, wherein the at least one electrically conductive structure is configured to trigger at least one negative signal by retransmission in the touch-sensitive sensor matrix in at least one corner point of a square of the touch-sensitive sensor matrix outside the annular touch surface, to trigger at least one negative signal in a center of the annular touch surface where there is no electrically conductive material, and to trigger at least one positive signal in the touch-sensitive sensor matrix where the annular touch surface overlaps with the touch-sensitive sensor matrix, and wherein the square of the touch-sensitive sensor matrix is defined with a width or length corresponding to a diameter of the annular touch surface and surrounds the annular touch surface when placing the arrangement on the touch-sensitive sensor matrix and wherein the corner points of the square lie outside the annular touch surface such that they do not overlap with the annular touch surface.

21. The method of claim 20, wherein the at least one electrically conductive structure is applied to the electrically insulating substrate material by screen printing, wherein an outer diameter of the annular touch surface is at least 10 mm, and wherein the at least one marker is configured to break a rotational symmetry of the annular touch surface.

* * * * *